US012480044B2

(12) United States Patent
Torimoto et al.

(10) Patent No.: US 12,480,044 B2
(45) Date of Patent: Nov. 25, 2025

(54) METHOD OF PRODUCING SEMICONDUCTOR NANOPARTICLES

(71) Applicants: National University Corporation Tokai National Higher Education and Research System, Nagoya (JP); OSAKA UNIVERSITY, Suita (JP); NICHIA CORPORATION, Anan (JP)

(72) Inventors: Tsukasa Torimoto, Nagoya (JP); Tatsuya Kameyama, Nagoya (JP); Susumu Kuwabata, Suita (JP); Taro Uematsu, Suita (JP); Yohei Ikagawa, Naruto (JP); Daisuke Oyamatsu, Tokushima (JP); Tomoya Kubo, Tokushima (JP)

(73) Assignees: National University Corporation Tokai National Higher Education and Research System, Nagoya (JP); OSAKA UNIVERSITY, Suita (JP); NICHIA CORPORATION, Anan (JP)

( * ) Notice: Subject to any disclaimer, the term of this patent is extended or adjusted under 35 U.S.C. 154(b) by 695 days.

(21) Appl. No.: 17/905,900

(22) PCT Filed: Mar. 8, 2021

(86) PCT No.: PCT/JP2021/009071
§ 371 (c)(1),
(2) Date: Sep. 8, 2022

(87) PCT Pub. No.: WO2021/182417
PCT Pub. Date: Sep. 16, 2021

(65) Prior Publication Data
US 2023/0151271 A1    May 18, 2023

(30) Foreign Application Priority Data
Mar. 9, 2020   (JP) ................. 2020-040094

(51) Int. Cl.
*C09K 11/62*   (2006.01)
*B82Y 20/00*   (2011.01)
*B82Y 40/00*   (2011.01)
*C01B 17/20*   (2006.01)
*C01G 5/00*   (2006.01)
*C09K 11/58*   (2006.01)
*C09K 11/88*   (2006.01)

(52) U.S. Cl.
CPC ............ *C09K 11/621* (2013.01); *C01B 17/20* (2013.01); *C01G 5/006* (2013.01); *C09K 11/582* (2013.01); *C09K 11/881* (2013.01); *B82Y 20/00* (2013.01); *B82Y 40/00* (2013.01)

(58) Field of Classification Search
CPC ... C09K 11/621; C09K 11/881; C09K 11/582; C01B 17/20; C01G 5/006
See application file for complete search history.

(56) References Cited

U.S. PATENT DOCUMENTS

| | | |
|---|---|---|
| 2009/0159849 A1 | 6/2009 | Uehara et al. |
| 2010/0193806 A1 | 8/2010 | Byun |
| 2015/0162468 A1 | 6/2015 | Newman |
| 2020/0006601 A1 | 1/2020 | Torimoto et al. |
| 2020/0295227 A1* | 9/2020 | Torimoto ........... H10H 20/8512 |
| 2021/0040385 A1 | 2/2021 | Kuwabata et al. |
| 2021/0083146 A1 | 3/2021 | Kuwabata et al. |
| 2022/0285589 A1* | 9/2022 | Torimoto ........... H10H 20/8512 |

FOREIGN PATENT DOCUMENTS

| | | | |
|---|---|---|---|
| CN | 108659814 | * | 10/2018 |
| JP | 2007169605 A | | 7/2007 |
| JP | 2007197612 A | | 8/2007 |
| JP | 2010177656 A | | 8/2010 |
| JP | 2012212862 A | | 11/2012 |
| JP | 2013236043 A | | 11/2013 |
| JP | 2017501571 A | | 1/2017 |
| JP | 2018141141 A | | 9/2018 |
| JP | 2020033245 A | | 3/2020 |
| WO | 2014129067 A1 | | 8/2014 |
| WO | 2018159699 A1 | | 9/2018 |
| WO | 2019160093 A1 | | 8/2019 |
| WO | 2019160094 A1 | | 8/2019 |
| WO | WO 2019/160094 | * | 8/2019 |
| WO | WO 2023/157640 | * | 8/2023 |

OTHER PUBLICATIONS

Taniguchi, Y., et al., A Versatile Surface Design to Disperse Nanoparticles in Ionic Liquids and Organic Solvents, Chemistry Letters, (2016), vol. 45, pp. 898-900, 3 pages.
"Quaternary quantum dots with gradient valence band for all-inorganic perovskite solar cells," Feng Li et al., Journal of Colloid and Interface Science, 549, 2019, 33-41.

* cited by examiner

*Primary Examiner* — C Melissa Koslow
(74) *Attorney, Agent, or Firm* — Hunton Andrews Kurth LLP

(57) ABSTRACT

Provided is a method of producing semiconductor nanoparticles exhibiting band-edge emission with a short emission peak wavelength. The method of producing semiconductor nanoparticles comprises: obtaining a first mixture that contains a Ag salt, an In salt, a compound containing Ga and S, and an organic solvent; and performing a heat treatment of the first mixture at a temperature in a range of 125° C. or higher and 300° C. or lower to obtain first semiconductor nanoparticles.

9 Claims, 8 Drawing Sheets

US 12,480,044 B2

METHOD OF PRODUCING SEMICONDUCTOR NANOPARTICLES

CROSS-REFERENCE TO RELATED APPLICATIONS

This is a national phase application based on International Patent Application No. PCT/JP2021/009071 filed Mar. 8, 2021, claiming priority to Japanese Patent Application No. 2020-040094 filed Mar. 9, 2020, the entire contents of which all are incorporated herein by reference.

TECHNICAL FIELD

The present disclosure relates to a method of producing semiconductor nanoparticles.

BACKGROUND ART

Semiconductor particles with a particle size of, for example, 10 nm or smaller are known to exhibit a quantum size effect, and such nanoparticles are referred to as "quantum dots" (also referred to as "semiconductor quantum dots"). The "quantum size effect" refers to a phenomenon in which the valence band and the conduction band that are regarded as continuous in bulk particles become discrete in nanoparticles and the band-gap energy varies with the particle size.

Quantum dots are capable of absorbing light and converting its wavelength into a light corresponding to the band-gap energy of the absorbed light; therefore, white light emitting devices utilizing the emission of such quantum dots have been proposed (refer to, for example, Japanese Laid-Open Patent Publication Nos. 2012-212862 and 2010-177656). Specifically, it has been proposed to allow quantum dots to absorb a portion of light emitted from a light emitting diode (LED) chip and obtain white light as a mixture of the light emitted from the quantum dots and the light emitted from the LED chip. These patent literatures propose the use of quantum dots of a Group 12-Group 16 binary system such as CdSe or CdTe, or a Group 14-Group 16 binary system such as PbS or PbSe. Further, in consideration of the toxicity of a compound containing Cd, Pb or the like, wavelength conversion films in which core-shell-structured semiconductor quantum dots free of such elements have been proposed (refer to, for example, WO 2014/129067). Moreover, sulfide nanoparticles have been studied as ternary semiconductor nanoparticles that can exhibit band-edge emission and have a low-toxicity composition, (refer to, for example, WO 2018/159699 and WO 2019/160094).

SUMMARY OF INVENTION

Technical Problem

An object of one mode of the present disclosure is to provide a method of producing semiconductor nanoparticles that can exhibit band-edge emission with a short emission peak wavelength.

Solution to Problem

A first embodiment is a method of producing semiconductor nanoparticles, the method comprising: obtaining a first mixture containing a silver (Ag) salt, an indium (In) salt, a compound containing gallium (Ga) and sulfur (S), and an organic solvent; and performing a heat treatment of the first mixture at a temperature in a range of 125° C. or higher and 300° C. or lower to obtain first semiconductor nanoparticles (hereinafter also referred to as "core").

A second embodiment is a method of producing semiconductor nanoparticles, the method comprising: providing a second mixture that contains the first semiconductor nanoparticles obtained by the production method of the first embodiment, a compound containing a Group 13 element, and a simple substance composed of a Group 16 element or a compound containing a Group 16 element; and performing a heat treatment of the second mixture to obtain second semiconductor nanoparticles (hereinafter, also referred to as "core-shell semiconductor nanoparticles").

A third embodiment is a method of producing semiconductor nanoparticles, the method comprising performing a third heat treatment of a third mixture containing a silver (Ag) salt, an indium (In) salt, a compound having a gallium (Ga)-sulfur (S) bond, a gallium halide, and an organic solvent to obtain third semiconductor nanoparticles. This method of producing semiconductor nanoparticles may further comprise performing a fourth heat treatment of a fourth mixture that contains the third semiconductor nanoparticles and a gallium halide to obtain fourth semiconductor nanoparticles.

Advantageous Effects of Invention

According to an embodiment of the present disclosure, a method of producing semiconductor nanoparticles that can exhibit band-edge emission with a short emission peak wavelength can be provided.

DESCRIPTION OF EMBODIMENTS

Figure 1:
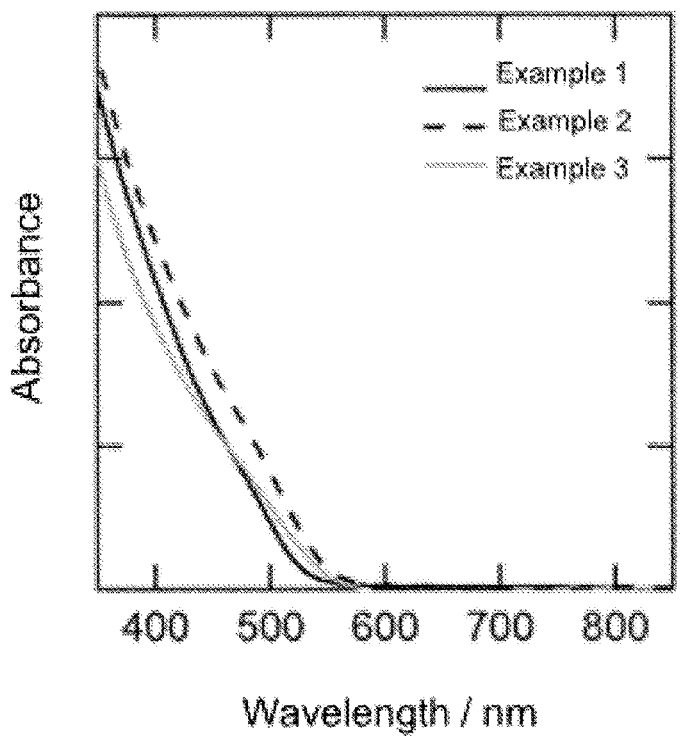
FIG. 1 shows absorption spectra of the core-shell semiconductor nanoparticles of Examples 1 to 3.

The term "step" used herein encompasses not only a discrete step but also a step that cannot be clearly distinguished from other steps, as long as the intended purpose of the step is achieved. When there are plural substances that correspond to a component of a composition, an indicated amount of the component contained in the composition means, unless otherwise specified, a total amount of the plural substances existing in the composition. Further, upper limit and lower limit values that are described for a numerical range in the present specification can be arbitrarily selected and combined. Embodiments of the present invention will now be described in detail. It is noted here, however, that the below-described embodiments are merely examples of a method of producing semiconductor nanoparticles that embody the technical idea of the present invention, and the present invention is not limited to the below-described method of producing semiconductor nanoparticles.

Semiconductor Nanoparticles

Semiconductor nanoparticles contain a semiconductor containing Ag, In, Ga, and S, and emit light with an emission peak having a full width at half maximum of, for example, 70 nm or less when irradiated with light. The crystal structure of the semiconductor nanoparticles may contain at least a tetragonal crystal, and may be substantially a tetragonal crystal. The semiconductor nanoparticles can exhibit band-edge emission with a good quantum yield. Further, by containing Ga in addition to In, the semiconductor nanoparticles can exhibit a shorter emission peak wavelength (e.g., 545 nm or shorter) as compared to in a case of containing only In.

In the composition of the semiconductor nanoparticles, a content ratio of Ag is, for example, 10% by mole or higher and 30% by mole or lower, preferably 15% by mole or higher and 25% by mole or lower. A total content ratio of In and Ga is, for example, 15% by mole or higher and 35% by mole or lower, preferably 20% by mole or higher and 30% by mole or lower. A content ratio of S is, for example, 35% by mole or higher and 55% by mole or lower, preferably 40% by mole or higher and 55% by mole or lower.

Semiconductor nanoparticles that contain Ag, In and S, and that have a tetragonal, hexagonal, or orthorhombic crystal structure are introduced in literatures and the like generally as those represented by a composition formula $AgInS_2$. The semiconductor nanoparticles according to the present embodiment are actually not limited to such semiconductor nanoparticles having a stoichiometric composition represented by the above-described composition formula and, particularly, a ratio (Ag/(In+Ga)) of the number of Ag atoms with respect to a total number of In and Ga atoms may be smaller than 1, or conversely, may be 1 or larger. In addition, a sum of the number of Ag atoms and the total number of In and Ga atoms is not always equal to the number of S atoms. Therefore, in the present specification, where it is irrelevant whether a semiconductor containing specific elements has a stoichiometric composition or not, the composition of the semiconductor may be represented by a formula in which the constituent elements are connected by "—" as in Ag—In—Ga—S.

Among semiconductor nanoparticles containing the above-described elements, those having a hexagonal crystal structure are wurtzite-type semiconductor nanoparticles, and those having a tetragonal crystal structure are chalcopyrite-type semiconductor nanoparticles. The crystal structure is identified by, for example, measuring the X-ray diffraction (XRD) pattern obtained by XRD analysis. Specifically, an XRD pattern obtained from semiconductor nanoparticles is compared with known XRD patterns of semiconductor nanoparticles represented by a composition $AgInS_2$, or with XRD patterns determined by simulation using crystal structure parameters. If the pattern of the semiconductor nanoparticles corresponds to any of the known patterns and simulated patterns, the crystal structure of the semiconductor nanoparticles may be said to be that of the corresponding known or simulated pattern.

An aggregate of the semiconductor nanoparticles may contain a mixture of semiconductor nanoparticles having different crystal structures. In this case, peaks derived from the plural kinds of crystal structures are observed in the XRD pattern. The core-shell semiconductor nanoparticles of the first mode are composed of substantially tetragonal crystals and, therefore, a peak corresponding to the tetragonal crystals is observed, while peaks derived from other crystal structures are substantially not observed.

Ag constituting the semiconductor nanoparticles may be partially substituted and contain at least one of Cu, Au, and an alkali metal; however, it may be composed of substantially Ag. The term "substantially" used herein indicates that a ratio of the number of atoms of elements other than Ag is, for example, 10% or lower, preferably 5% or lower, more preferably 1% or lower, with respect to a total number of atoms of Ag and the elements other than Ag.

Further, the semiconductor nanoparticles may contain substantially Ag and an alkali metal (hereinafter also referred to as "$M^a$") as constituent elements corresponding to Ag. The term "substantially" used herein indicates that a ratio of the number of atoms of elements other than Ag and the alkali metal is, for example, 10% or lower, preferably 5% or lower, more preferably 1% or lower, with respect to a total number of atoms of Ag, the alkali metal, and the elements other than Ag and the alkali metal. Examples of the alkali metal include lithium (Li), sodium (Na), potassium (K), rubidium (Rb), and cesium (Cs). The alkali metal can be a monovalent cation in the same manner as Ag and, therefore, can partially substitute Ag in the composition of the semiconductor nanoparticles. Particularly, Li is preferably used since it has about the same ionic radius as Ag. Partial substitution of Ag in the composition of the semiconductor nanoparticles leads to, for example, a widened band gap and a shift of the emission peak wavelength to the shorter wavelength side. In addition, it is believed that, although the details are unclear, the lattice defects of the semiconductor nanoparticles are reduced and the quantum yield of band-edge emission is improved. When the semiconductor nanoparticles contain an alkali metal, the semiconductor nanoparticles may contain at least Li.

When the semiconductor nanoparticles contain Ag and an alkali metal ($M^a$), a content ratio of the alkali metal in the composition of the semiconductor nanoparticles is, for example, higher than 0% by male but lower than 30% by mole, preferably 1% by mole or higher and 25% by mole or lower. Further, in the composition of the semiconductor nanoparticles, a ratio ($M^a/(Ag+M^a)$) of the number of alkali metal ($M^a$) atoms with respect to a total of the number of Ag atoms and the number of alkali metal ($M^a$) atoms is, for example, lower than 1, preferably 0.8 or lower, more preferably 0.4 or lower, still more preferably 0.2 or lower. This ratio is, for example, higher than 0, preferably 0.05 or higher, more preferably 0.1 or higher.

In and Ga may be partially substituted and contain at least one of Al and Tl; however, they are preferably composed of substantially at least one of In and Ga. The term "substantially" used herein indicates that a ratio of the number of atoms of elements other than In and Ga is, for example, 10% or lower, preferably 5% or lower, more preferably 1% or lower, with respect to a total number of atoms of In, Ga, and the elements other than In and Ga.

In the semiconductor nanoparticles, a ratio (In/(In+Ga)) of the number of In atoms with respect to a total number of In and Ga atoms may be, for example, 0.01 or higher but lower than 1, and it is preferably 0.1 or higher and 0.99 or lower. When the ratio of the number of In atoms with respect to a total number of In and Ga atoms is in this prescribed range, a short emission peak wavelength (e.g., 545 nm or shorter) can be obtained. Further, a ratio (Ag/(In+Ga)) of the number of Ag atoms with respect to a total number of In and Ga atoms is, for example, 0.3 or higher and 1.2 or lower, preferably 0.5 or higher and 1.1 or lower. A ratio (S/(Ag+In+Ga)) of the number of S atoms with respect to a total number of atoms of Ag, In, and Ga is, for example, 0.8 or higher and 1.5 or lower, preferably 0.9 or higher and 1.2 or lower.

S may be partially substituted and contain at least one element of Se and Te; however, it is preferably composed of substantially S. The term "substantially" used herein indicates that a ratio of the number of atoms of elements other than S is, for example, 10% or lower, preferably 5% or lower, more preferably 1% or lower, with respect to a total number of atoms of S and the elements other than S.

The semiconductor nanoparticles may be composed of substantially Ag, In, Ga, S, and the above-described elements partially substituting these elements. The term "substantially" used herein takes into consideration that elements other than Ag, In, Ga, S, and the elements partially substituting these elements may be unavoidably incorporated due to, for example, contamination with impurities.

The semiconductor nanoparticles have a composition represented by, for example, the following formula (1):

(1)

wherein, p, q, and r satisfy $0<p\le 1$, $0.20<q\le 1.2$, and $0<r<1$; and $M^a$ represents an alkali metal.

Core-Shell Semiconductor Nanoparticles

In the present specification, "semiconductor nanoparticles" may be the above-described semiconductor nanoparticles (first semiconductor nanoparticles), or second semiconductor nanoparticles (core-shell semiconductor nanoparticles) that have a deposit (hereinafter, also referred to as "shell") containing a Group 13 element and a Group 16 element on the surfaces of the respective first semiconductor nanoparticles. The deposit may cover the surface of each first semiconductor nanoparticle. Accordingly, in a surface analysis of the second semiconductor nanoparticles, elements (e.g., Ag) that may be contained only in the first semiconductor nanoparticles do not have to be detected.

In the second semiconductor nanoparticles, a semiconductor containing a Group 13 element and a Group 16 element may be arranged in the vicinity of the surfaces of the first semiconductor nanoparticles, or the second semiconductor nanoparticles may include the first semiconductor nanoparticles and a semiconductor layer that contains a Group 13 element and a Group 16 element and is arranged on the surfaces of the respective first semiconductor nanoparticles. Alternatively, the second semiconductor nanoparticles may contain a semiconductor containing Ag, In, Ga, and S, and a semiconductor containing a Group 13 element and a Group 16 element may be arranged on the surface. Hereinafter, for the sake of convenience, the first semiconductor nanoparticles are each referred to as "core", the deposit is referred to as "shell", and the second semiconductor nanoparticles are referred to as "core-shell semiconductor nanoparticles".

In the core-shell semiconductor nanoparticles, the cores may be the above-described semiconductor nanoparticles that contain Ag, In, Ga, and S. The shell may be composed of substantially a Group 13 element and a Group 16 element, and may contain a semiconductor having a larger band-gap energy than that of the cores. The core-shell semiconductor nanoparticles may have a substantially tetragonal crystal structure. Further, the core-shell semiconductor nanoparticles may emit light with an emission peak having a full width at half maximum of 70 nm or less. The core-shell semiconductor nanoparticles exhibit band-edge emission with a good quantum yield. This is believed to be because, for example, the core-shell semiconductor nanoparticles have a substantially tetragonal crystal structure. Moreover, the core-shell semiconductor nanoparticles can exhibit a shorter emission peak wavelength (e.g., 545 nm or shorter) as compared to in a case where the cores do not contain Ga.

Examples of the Group 13 element constituting the shell include boron (B), aluminum (Al), gallium (Ga), indium (In), and thallium (Tl). Examples of the Group 16 element constituting the shell include oxygen (O), sulfur (S), selenium (Se), tellurium (Te), and polonium (Po). The semiconductor constituting the shell may contain only one Group 13 element, or two or more Group 13 elements, and only one Group 16 element, or two or more Group 16 elements.

The shell may be constituted of a semiconductor composed of substantially a Group 13 element and a Group 16 element. The term "substantially" used herein indicates that, when a total number of atoms of all elements contained in the shell is taken as 100%, a ratio of the number of atoms of elements other than the Group 13 element and the Group 16 element is, for example, 10% or less, preferably 5% or less, more preferably 1% or less.

The shell may be constituted by selecting its composition and the like in accordance with the band-gap energy of the above-described semiconductor constituting the core. Alternatively, when the composition and the like of the shell are predetermined, the core may be designed such that the band-gap energy of the semiconductor constituting the core is smaller than that of the shell. Generally, a semiconductor composed of Ag—In—S has a band-gap energy of 1.8 ev or higher and 1.9 ev or lower.

The semiconductor constituting the shell may have a band-gap energy of, for example, 2.0 eV or higher and 5.0 eV or lower, particularly 2.5 eV or higher and 5.0 eV or lower. The band-gap energy of the shell may be larger than that of the core by, for example, about 0.1 eV or higher and 3.0 eV or lower, particularly about 0.3 eV or higher and 3.0 eV or lower, more particularly about 0.5 eV or higher and 1.0 eV or lower. When the difference between the band-gap energy of the semiconductor constituting the shell and that of the semiconductor constituting the core is equal to or greater than the above-described lower limit value, the ratio of emission other than band-edge emission in the emission from the core tends to be reduced, resulting in an increase in the ratio of band-edge emission.

Further, the band-gap energy of the semiconductor constituting the core and that of the semiconductor constituting the shell are preferably selected such that type-I band alignment where the band-gap energy of the core exists between the band-gap energy of the shell is formed at heterojunction of the core and the shell. The formation of type-I band alignment enables to obtain the band-edge emission from the core in a more favorable manner. In the type-I band alignment, a barrier of at least 0.1 eV is preferably formed between the band gap of the core and the band gap of the shell and, for example, a barrier of 0.2 eV or higher, or 0.3 eV or higher may be formed. An upper limit of the barrier is, for example, 1.8 eV or lower, particularly 1.1 eV or lower. When the barrier is equal to or higher than the above-described lower limit value, the ratio of emission other than band-edge emission in the emission from the core tends to be reduced, resulting in an increase in the ratio of band-edge emission.

The semiconductor constituting the shell may contain In or Ga as the Group 13 element. Further, the shell may contain S as the Group 16 element. A semiconductor containing In or Ga, or S tends to have a larger band-gap energy than the semiconductor of the above-described core. Further, the semiconductor constituting the shell may contain elemental oxygen (O). The semiconductor containing In or Ga, S, and O tends to have a larger band-gap energy than the above-described core.

The semiconductor of the shell may have a crystal system conforming to that of the semiconductor of the core, and may have a lattice constant that is the same as or close to that of the semiconductor of the core. The shell formed of a semiconductor which has a crystal system conforming to that of the semiconductor of the core and a lattice constant close to that of the semiconductor of the core (including a case where a multiple of the lattice constant of the shell is similar to the lattice constant of the core) can favorably cover the periphery of the core. For example, the core generally has a tetragonal crystal system, and examples of a crystal system conforming thereto include a tetragonal system and an orthorhombic crystal system. When Ag—In—S has a tetragonal crystal system, it is preferred that the lattice constants of the constituent elements be 0.5828 nm, 0.5828 nm, and 1.119 nm, respectively; and that the shell covering this Ag—In—S have a tetragonal or cubic crystal system, and its lattice constants or multiples thereof be close to the lattice constants of Ag—In—S. Alternatively, the shell may be amorphous.

Whether or not an amorphous shell is formed can be verified based on the observation of the semiconductor nanoparticles having a core-shell structure by HAADF-STEM. When an amorphous shell is formed, specifically, in HAADF-STEM, a central part is observed with a regular pattern, such as a stripe pattern or a dot pattern, and its surrounding part is observed with no regular pattern. According to HAADF-STEM, a substance having a regular structure as in the case of a crystalline substance is observed as an image having a regular pattern, while a substance having no regular structure as in the case of an amorphous substance is not observed as an image having a regular pattern. Therefore, when the shell is amorphous, the shell can be observed as a part that is clearly different from the core observed as an image having a regular pattern (the core may have a crystal structure of a tetragonal system or the like).

When the shell is constituted of Ga—S, since Ga is an element lighter than Ag and In that are contained in the core, the shell tends to be observed darker than the core in an image obtained by HAADF-STEM.

Whether or not an amorphous shell is formed can also be verified by observing the semiconductor nanoparticles having a core-shell structure according to the present embodiment under a high-resolution transmission electron microscope (HRTEM). In an image obtained by HRTEM, the core portion is observed as a crystal lattice image (an image having a regular pattern) while the shell portion that is amorphous is not observed as a crystal lattice image, and the shell portion is observed as a part having a black and white contrast but no regular pattern.

Meanwhile, the shell preferably does not constitute a solid solution with the core. If the shell forms a solid solution with the core, since the shell and the core are integrated together, the mechanism of the present embodiment in which band-edge emission is obtained by covering the core with the shell and thereby modifying the condition of the core surface, cannot be obtained. For example, it has been confirmed that band-edge emission cannot be obtained from the core even when the surface of the core composed of Ag—In—S is covered with zinc sulfide (Zn—S) having a stoichiometric or non-stoichiometric composition. Zn—S, in its relationship with Ag—In—S, satisfies the above-described conditions in terms of band-gap energy, and gives a type-I band alignment. Nevertheless, band-edge emission was not obtained from the above-described specific semiconductor, and it is surmised that the reason for this is because the semiconductor of the core and Zn—S formed a solid solution, eliminating the core-shell interface.

The shell may contain, but not limited to, a combination of In and S, a combination of Ga and S, or a combination of In, Ga, and S, as a combination of Group 13 and Group 16 elements. The combination of In and S may be in the form of indium sulfide, the combination of Ga and S may be in the form of gallium sulfide, and the combination of In, Ga, and S may be in the form of indium gallium sulfide. Indium sulfide constituting the shell does not necessarily have a stoichiometric composition ($In_2S_3$) and, in this sense, indium sulfide may be hereinafter represented by a formula $InS_x$ (wherein, x represents an arbitrary number that is not limited to an integer, such as 0.8 to 1.5). Similarly, gallium sulfide does not necessarily have a stoichiometric composition ($Ga_2S_3$) and, in this sense, gallium sulfide may be hereinafter represented by a formula GaSx (wherein, x represents an arbitrary number that is not limited to an integer, such as 0.8 or higher and 1.5 or lower). Indium gallium sulfide may have a composition represented by $In_{2(1-y)}Ga_{2y}S_3$ (wherein, y represents an arbitrary number that is larger than 0 but smaller than 1), or $In_pGa_{1-p}S_q$ (wherein, p represents an arbitrary number that is larger than 0 but smaller than 1, and q represents an arbitrary number that is not limited to an integer).

The form of elemental oxygen constituting the shell is not clear; however, it may be, for example, Ga—O—S or $Ga_2O_3$.

Indium sulfide has a band-gap energy of 2.0 eV to 2.4 eV, and indium sulfide with a cubic crystal system has a lattice constant of 1.0775 nm. Gallium sulfide has a band-gap energy of about 2.5 eV or higher and 2.6 eV or lower, and gallium sulfide with a tetragonal crystal system has a lattice constant of 0.5215 nm. It is noted here, however, that the above-described crystal systems and the like are all reported values, and the shell does not necessarily satisfy these reported values in the actual semiconductor nanoparticles having a core-shell structure.

Indium sulfide and gallium sulfide can be preferably used as the semiconductor constituting the shell arranged on the surface of the core. Particularly, gallium sulfide is preferably used because of its large band-gap energy. When gallium sulfide is used, a stronger band-edge emission can be obtained as compared to in a case of using indium sulfide.

The semiconductor constituting the shell may further contain an alkali metal ($M^a$) in addition to Group 13 and Group 16 elements. The alkali metal contained in the semiconductor constituting the shell may include at least lithium. When the semiconductor constituting the shell contains an alkali metal, a ratio of the number of alkali metal atoms with respect to a sum of the number of alkali metal atoms and the number of Group 13 element atoms may be, for example, 0.01 or higher but lower than 1, or 0.1 or higher and 0.9 or lower. Further, a ratio of the number of Group 16 element atoms with respect to a sum of the number of alkali metal atoms and the number of Group 13 element atoms may be, for example, 0.25 or higher and 0.75 or lower.

The core-shell semiconductor nanoparticles, each of which includes the above-described core and the above-described shell arranged on the surface of the core, may have an average particle size of, for example, 50 nm or smaller. From the standpoints of the ease of production and the quantum yield of band-edge emission, the average particle size is preferably in a range of 1 nm or larger and 20 nm or smaller, more preferably 1.6 nm or larger and 8 nm or smaller, particularly preferably 2 nm or larger and 7.5 nm or smaller.

The average particle size of the core-shell semiconductor nanoparticles may be determined from, for example, a TEM image captured using a transmission electron microscope (TEM). The particle size of individual particle specifically refers to the length of the longest line segment among those line segments that exist inside the particle observed in a TEM image and connect two arbitrary points on the circumference of the particle.

It is noted that, for a rod-shaped particle, the length of its short axis is regarded as the particle size. The term "rod-shaped particle" used herein refers to a particle observed in a TEM image to have a short axis and a long axis perpendicular to the short axis, in which a ratio of the length of the long axis with respect to the length of the short axis is higher than 1.2. In a TEM image, a rod-shaped particle is observed to have, for example, a quadrangular shape such as a rectangular shape, an elliptical shape, or a polygonal shape. The shape of a cross-section which is a plane perpendicular to the long axis of the rod shape may be, for example, circular, elliptical, or polygonal. Specifically, for a rod-shaped particle having an elliptical shape, the length of the long axis means the length of the longest line segment among those line segments connecting any two points on the circumference of the particle and, for a rod-shaped particle having a rectangular or polygonal shape, the length of the long axis means the length of the longest line segment among those line segments that are parallel to the longest side among all sides defining the circumference of the particle and connect any two points on the circumference. The length of the short axis means the length of the longest line segment perpendicular to the line segment defining the length of the long axis among those line segments connecting any two points on the circumference of the particle.

The average particle size of the semiconductor nanoparticles is determined by measuring the particle size for all measurable particles observed in a TEM image captured at a magnification of ×50,000 to ×150,000, and calculating the arithmetic mean of the thus measured values. The "measurable" particles are those particles whose outlines are entirely observable in a TEM image. Accordingly, in a TEM image, a particle whose outline is partially not included in the captured area and thus appears to be "cut" is not a measurable particle. When a single TEM image contains 100 or more measurable particles, the average particle size is determined using this TEM image. Meanwhile, when a single TEM image contains less than 100 measurable particles, another TEM image is further captured at a different position, and the particle size is measured for 100 or more measurable particles contained in two or more TEM images to determine the average particle size.

In the semiconductor nanoparticles having a core-shell structure, the cores may have an average particle size of, for example, 10 nm or smaller, particularly 8 nm or smaller. The average particle size of the cores may be in a range of 1.5 nm or larger and 10 nm or smaller, particularly in a range of 1.7 nm or larger and 7.5 nm or smaller. When the average particle size of the cores is equal to or smaller than the above-described upper limit value, a quantum size effect is likely to be obtained.

The thickness of the shell may be in a range of 0.1 nm or larger and 50 nm or smaller or in a range of 0.1 nm or larger and 10 nm or smaller, particularly in a range of 0.3 nm or larger and 3 nm or smaller. When the thickness of the shell is equal to or larger than the above-described lower limit value, the effect provided by covering the cores with the shell is sufficiently exerted, so that band-edge emission is likely to be obtained.

The average particle size of the cores and the thickness of the shell may be determined by, for example, observing the semiconductor nanoparticles having a core-shell structure by HAADF-STEM. Particularly, when the shell is amorphous, the thickness of the shell easily observable by HAADF-STEM as a part different from a core can be easily determined. In this case, the particle size of the cores can be determined in accordance with the method described above for semiconductor nanoparticles. When the thickness of the shell is not uniform, the smallest thickness is defined as the thickness of the shell of a particle.

Alternatively, the average particle size of the cores may be measured in advance before covering the cores with the shell. The average particle size of the semiconductor nanoparticles having a core-shell structure is then measured, and the thickness of the shell may be determined by calculating the difference between the thus measured average particle size and the average particle size of the cores that has been measured in advance.

The core-shell semiconductor nanoparticles preferably have a substantially tetragonal crystal structure. The crystal structure is identified by, for example, measuring the X-ray diffraction (XRD) pattern obtained by XRD analysis in the same manner as described above. The term "substantially tetragonal crystal" used herein indicates that a ratio of the height of a peak at about 48°, which represents hexagonal and orthorhombic crystals, with respect to the height of a main peak at about 26°, which represents a tetragonal crystal, is, for example, 10% or less, or 5% or less.

The core-shell semiconductor nanoparticles, when irradiated with light such as ultraviolet light, visible light, or infrared radiation, emit light having a longer wavelength than the irradiated light. Specifically, when irradiated with, for example, ultraviolet light, visible light, or infrared radiation, the semiconductor nanoparticles can emit light that has a longer wavelength than the irradiated light, satisfying at least one of the following conditions: the emission lifetime of the main component is 200 ns or shorter; and the emission spectrum has a full width at half maximum of 70 nm or less.

When irradiated with light having a peak at about 450 nm, the core-shell semiconductor nanoparticles in which the core has a composition including In and Ga emit light having an emission peak wavelength in a range of 490 nm or longer and 545 nm or shorter. The emission peak wavelength is preferably 495 nm or longer and 540 nm or shorter. In the emission spectrum, the full width at half maximum of the emission peak is, for example, 70 nm or less, preferably 60 nm or less, more preferably 50 nm or less, particularly preferably 40 nm or less. A lower limit value of the full width at half maximum may be, for example, not less than 10 nm. For example, when the composition of the core is Ag—In—Ga—S that is obtained by substituting at least part of In, which is a Group 13 element, for Ga, which is also a Group 13 element, with respect to Ag—In—S, the emission peak shifts to the shorter wavelength side.

The term "emission lifetime" used here refers to a lifetime of emission that is measured using a device called fluorescence lifetime measuring device as in the below-described Examples. Specifically, the above-descried "emission lifetime of the main component" can be determined by the following procedure. First, the semiconductor nanoparticles are allowed to emit light by irradiation with an excitation light, and a change in the attenuation (afterglow) over time is measured for a light having a wavelength near the spectral emission peak, for example, a wavelength within a range of the peak wavelength±50 nm. The measurement of the change over time is initiated upon termination of the irradiation of the excitation light. The resulting attenuation curve is generally a sum of plural attenuation curves derived from relaxation processes of emission, heat, and the like. Accordingly, in the present embodiment, assuming that the attenuation curve contains three components (i.e., three attenuation curves), parameter fitting is performed such that the attenuation curve is represented by the following formula where I(t) denotes the emission intensity. This parameter fitting is performed using a special software.

$$I(t)=A_1 \exp(-t/\tau_1)+A_2\exp(-t/\tau_2)+A_3\exp(-t/\tau_3)$$

In the above formula, $\tau_1$, $\tau_2$, and $\tau_3$ of the respective components each denote the time required for attenuation of the initial emission intensity to 1/e (36.8%), which corresponds to the emission lifetime of each component. The emission lifetime is in ascending order of $\tau_1$, $\tau_2$, and $\tau_3$. Further, $A_1$, $A_2$, and $A_3$ denote contribution ratios of the respective components. For example, when a component having the largest integral value of curves represented by $A_x\exp(-t/\tau_x)$ is defined as the main component, the main component has an emission lifetime $\tau$ of 200 ns or shorter, 100 ns or shorter, or 80 ns or shorter. Such emission is presumed to be band-edge emission. For the identification of the main component, the values of $A_x\times\tau_x$ obtained by integration of the t value of $A_x\exp(-t/\tau_x)$ from 0 to infinity are compared, and a component having the largest value is defined as the main component.

It is noted here that an actual attenuation curve is not much different from those attenuation curves that are each drawn from a formula obtained by performing parameter fitting where the emission attenuation curve is assumed to contain three, four, or five components. Therefore, for the determination of the emission lifetime of the main component in the present embodiment, the number of components contained in the emission attenuation curve is assumed to be three so as to avoid complicated parameter fitting.

The emission of the core-shell semiconductor nanoparticles may include defect emission (e.g., donor-acceptor emission) in addition to band-edge emission; however, the emission is preferably substantially band-edge emission alone. Defect emission generally has a longer emission lifetime and a broader spectrum with a peak on the longer wavelength side as compared to band-edge emission. The expression "substantially band-edge emission alone" used herein means that the purity of the band-edge emission component in the emission spectrum is 40% or higher, and the purity is preferably 50% or higher, more preferably 60% or higher, still more preferably 65% or higher. An upper limit value of the purity of the band-edge emission component may be, for example, 100% or lower, lower than 100%, or 95% or lower. The "purity of the band-edge emission component" is represented by the following formula when parameter fitting, where a band-edge emission peak and a defect emission peak are assumed to each have a shape of normal distribution, is performed for the emission spectrum to separate its peaks into two, which are the band-edge emission peak and the defect emission peak, and the areas of these peaks are denoted as $a_1$ and $a_2$, respectively:

Purity (%) of band-edge emission component=$a_1$/ ($a_1$+$a_2$)×100.

When the emission spectrum contains no band-edge emission at all, i.e., when the emission spectrum contains only defect emission, the purity of the band-edge emission component is 0%; when band-edge emission and defect emission have the same peak area, the purity of the band-edge emission component is 50%; and when the emission spectrum contains only band-edge emission, the purity of the band-edge emission component is 100%.

The quantum yield of the band-edge emission is defined as a value obtained by multiplying the internal quantum yield, which is measured using a quantum yield measuring device at a temperature of 25° C. and calculated under the conditions of an excitation light wavelength of 450 nm and a fluorescence wavelength range of 470 nm to 900 nm, an excitation light wavelength of 365 nm and a fluorescence wavelength range of 450 nm or longer and 950 nm or shorter, or an excitation light wavelength of 450 nm and a fluorescence wavelength range of 500 nm or longer and 950 nm or shorter, by the above-described purity of the band-edge emission component, and dividing the product by 100. The quantum yield of the band-edge emission of the core-shell semiconductor nanoparticles is, for example, 10% or more, preferably 20% or more, more preferably 30% or more.

The peak position of the band-edge emission by the core-shell semiconductor nanoparticles can be shifted by modifying the particle size of the semiconductor nanoparticles. For example, when the particle size of the semiconductor nanoparticles is reduced, the peak wavelength of the band-edge emission tends to shift to the shorter wavelength side. A further reduction in the particle size of the semiconductor nanoparticles tends to further reduce the spectral full width at half maximum of the band-edge emission.

When the semiconductor nanoparticles exhibit defect emission in addition to band-edge emission, the intensity ratio of the band-edge emission, which is determined from a maximum peak intensity of the band-edge emission and a maximum peak intensity of the defect emission, may be, for example, 0.75 or higher, and it is preferably 0.85 or higher, more preferably 0.9 or higher, particularly preferably 0.93 or higher. An upper limit value thereof may be, for example, 1 or lower, lower than 1, or 0.99 or lower. The intensity ratio of the band-edge emission is represented by the following formula when parameter fitting, where a band-edge emission peak and a defect emission peak are assumed to each have a shape of normal distribution, is performed for the emission spectrum to separate its peaks into two, which are the band-edge emission peak and the defect emission peak, and the maximum intensity of these peaks are denoted as $b_1$ and $b_2$, respectively:

Intensity ratio of band-edge emission=$b_1/(b_1+b_2)$.

When the emission spectrum contains no band-edge emission at all, i.e., when the emission spectrum contains only defect emission, the intensity ratio of the band-edge emission is 0; when the band-edge emission and the defect emission have the same maximum peak intensity, the intensity ratio of the band-edge emission is 0.5; and when the emission spectrum contains only band-edge emission, the intensity ratio of the band-edge emission is 1.

The core-shell semiconductor nanoparticles also preferably exhibit an absorption or excitation spectrum (also referred to as "fluorescence excitation spectrum") with an exciton peak. An exciton peak is a peak resulting from exciton formation, and the appearance of this peak in an absorption or excitation spectrum means that the particles have a small particle size distribution and few crystal defects, and are thus suitable for band-edge emission. A sharper exciton peak means that an aggregate of the semiconductor nanoparticles contains a greater amount of particles having a uniform particle size with few crystal defects. Accordingly, it is expected that the semiconductor nanoparticles exhibit emission with a narrower full width at half maximum and an improved emission efficiency. In the absorption or excitation spectrum of the semiconductor nanoparticles of the present embodiment, an exciton peak is observed, for example, in a range of 350 nm or longer and 1,000 nm or shorter, preferably 450 nm or longer and 590 nm or shorter. The excitation spectrum for checking the presence or absence of an exciton peak may be measured by setting the observation wavelength around the peak wavelength.

Method of Producing Semiconductor Nanoparticles

The method of producing semiconductor nanoparticles comprises: the first providing step of obtaining a first mixture that contains a silver (Ag) salt, an indium (In) salt, a compound containing gallium (Ga) and sulfur (S), and an organic solvent; and the first heat treatment step of performing a heat treatment of the first mixture at a temperature in a range of 125° C. or higher and 300° C. or lower to obtain first semiconductor nanoparticles. The first semiconductor nanoparticles obtained in the first heat treatment step may be in the state of a dispersion.

By using a compound containing Ga and S as a supply source of Ga and S that are included in the composition of the semiconductor nanoparticles to be produced, it is made easy to control the composition of the semiconductor nanoparticles, so that semiconductor nanoparticles which exhibit band-edge emission with a short emission peak wavelength (e.g., 545 nm or shorter) and has an emission spectrum with a narrow full width at half maximum can be easily produced. In addition, the control of the particle size of the semiconductor nanoparticles to be produced is made easy, so that semiconductor nanoparticles having a narrow particle size distribution and an emission spectrum with a narrow full width at half maximum can be easily produced.

In the first providing step, a Ag salt, an In salt, a compound containing Ga and S, and an organic solvent are mixed to obtain a first mixture. Examples of the Ag salt and the In salt that are used in this production method include organic acid salts and inorganic acid salts. Specifically, examples of the inorganic acid salts include nitrates, acetates, sulfates, hydrochlorides, and sulfonates, and examples of the organic acid salts include acetates and acetylacetonates. Thereamong, organic acid salts are preferred since they are highly soluble in organic solvents.

From the standpoint of quantum yield, the Ag salt used in the first providing step may contain a compound containing Ag and S. The compound containing Ag and S may be, for example, a Ag salt of a sulfur-containing compound, examples of which include complexes of a sulfur-containing compound and a Ag ion. Examples of the sulfur-containing compound include thiocarbamic acid, dithiocarbamic acid, thiocarbonic acid, dithiocarbonic acid (xanthic acid), trithiocarbonic acid, thiocarboxylic acid, dithiocarboxylic acid, and derivatives thereof. Specific examples of the sulfur-containing compound include aliphatic thiocarbamic acids, aliphatic dithiocarbamic acids, aliphatic thiocarbonic acids, aliphatic dithiocarbonic acids, aliphatic trithiocarbonic acids, aliphatic thiocarboxylic acids, and aliphatic dithiocarboxylic acids, and the aliphatic thiocarbamic acids and the aliphatic dithiocarbamic acids include dialkylthiocarbamic acids and dialkyldithiocarbamic acids, respectively. Examples of the aliphatic groups in these acids include alkyl groups and alkenyl groups that have 1 or more and 12 or less carbon atoms. The alkyl groups in the dialkylthiocarbamic acids, the dialkyldithiocarbamic acids and the like may have, for example, 1 or more and 12 or less carbon atoms, preferably 1 or more and 4 or less carbon atoms, and two alkyl groups may be the same or different.

The compound containing Ga and S may be, for example, a Ga salt of a sulfur-containing compound, examples of which include complexes of a sulfur-containing compound and a Ga ion. Examples of the sulfur-containing compound include thiocarbamic acid, dithiocarbamic acid, thiocarbonic acid, dithiocarbonic acid (xanthic acid), trithiocarbonic acid, thiocarboxylic acid, dithiocarboxylic acid, and derivatives thereof. Specific examples of the sulfur-containing compound include aliphatic thiocarbamic acids, aliphatic dithiocarbamic acids, aliphatic thiocarbonic acids, aliphatic dithiocarbonic acids, aliphatic trithiocarbonic acids, aliphatic thiocarboxylic acids, and aliphatic dithiocarboxylic acids, and the aliphatic thiocarbamic acids and the aliphatic dithiocarbamic acids include dialkylthiocarbamic acids and dialkyldithiocarbamic acids, respectively. Examples of the aliphatic groups in these acids include alkyl groups and alkenyl groups that have 1 or more and 12 or less carbon atoms. The alkyl groups in the dialkylthiocarbamic acids, the dialkyldithiocarbamic acids and the like may have, for example, 1 or more and 12 or less carbon atoms, preferably 1 or more and 4 or less carbon atoms, and two alkyl groups may be the same or different.

A content ratio of Ag, In, Ga, and S in the first mixture may be selected as appropriate in accordance with the intended composition. In this case, the content ratio of Ag, In, Ga, and S does not have to conform to a stoichiometric ratio. For example, a ratio (Ga/(In+Ga)) of the number of moles of Ga with respect to a total number of moles of In and Ga may be 0.2 or higher and 0.95 or lower, 0.6 or higher and 0.9 or lower, or 0.8 or higher and 0.9 or lower. In addition, for example, a ratio (Ag/(Ag+In+Ga)) of the number of moles of Ag with respect to a total number of moles of Ag, In, and Ga may be 0.05 or higher and 0.55 or lower. Further, for example, a ratio (S/(Ag+In+Ga)) of the number of moles of S with respect to a total number of moles of Ag, In, and Ga may be 0.6 or higher and 1.6 or lower.

Examples of the organic solvent include: amines containing a hydrocarbon group having 4 or more and 20 or less carbon atoms, particularly alkylamines and alkenylamines having 4 or more and 20 or less carbon atoms; thiols containing a hydrocarbon group having 4 or more and 20 or less carbon atoms, particularly alkylthiols and alkenylthiols having 4 or more and 20 or less carbon atoms; phosphines containing a hydrocarbon group having 4 or more and 20 or less carbon atoms, particularly alkylphosphines and alkenylphosphines having 4 or more and 20 or less carbon atoms; and carboxylic acids containing a hydrocarbon group having 4 or more and 20 or less carbon atoms, particularly alkyl carboxylic acids and alkenyl carboxylic acids having 4 or more and 20 or less carbon atoms. These organic solvents can eventually modify the surfaces of the resulting semiconductor nanoparticles. These organic solvents may be used in combination of two or more thereof. For example, a mixed solvent of a combination of at least one selected from thiols containing a hydrocarbon group having 4 or more and 20 or less carbon atoms and at least one selected from amines containing a hydrocarbon group having 4 or more and 20 or less carbon atoms, a mixed solvent of a combination of at least one selected from amines containing a hydrocarbon group having 4 or more and 20 or less carbon atoms and at least one selected from carboxylic acids containing a hydrocarbon group having 4 or more and 20 or less carbon atoms, or a mixed solvent of a combination of at least one selected from alkenylamines having 4 or more and 20 or less carbon atoms and at least one selected from alkenyl carboxylic acids having 4 or more and 20 or less carbon atoms may be used. These organic solvents may also be used as a mixture with other organic solvent. Further, these organic solvents may each be solid at a normal temperature as long as they can be dissolved at 125° C. or higher.

The first mixture may further contain an alkali metal salt. Examples of the alkali metal (hereinafter, may be referred to as "$M^a$") include lithium (Li), sodium (Na), potassium (K), rubidium (Rb), and cesium (Cs), and the first mixture preferably contains Li since Li has an ionic radius close to that of Ag. Examples of the alkali metal salt include organic acid salts and inorganic acid salts. Specifically, examples of the inorganic acid salts include nitrates, acetates, sulfates, hydrochlorides, and sulfonates, and examples of the organic acid salts include acetates and acetylacetonates. Thereamong, organic acid salts are preferred since they are highly soluble in organic solvents.

When the first mixture contains an alkali metal salt, a ratio ($M^a$/(Ag+$M^a$)) of the number of alkali metal atoms with respect to a total number of Ag and alkali metal atoms may be, for example, lower than 1, and it is preferably 0.8 or lower, more preferably 0.4 or lower, still more preferably 0.2 or lower. Further, this ratio may be, for example, higher than 0, and it is preferably 0.05 or higher, more preferably 0.1 or higher.

In the first heat treatment step, the first mixture is heat-treated at a temperature in a range of 125° C. or higher and 300° C. or lower to obtain first semiconductor nanoparticles. The first heat treatment step may comprise: a temperature-raising step of raising the temperature of the first mixture to a temperature in a range of 125° C. or higher and 300° C. or lower; and the synthesis step of performing a heat treatment of the first mixture at a temperature in a range of 125° C. or higher and 300° C. or lower for a prescribed time.

The range to which the temperature is raised in the temperature-raising step is preferably 125° C. or higher and 200° C. or lower, more preferably 125° C. or higher and 175° C. or lower, still more preferably 130° C. or higher and 160° C. or lower, particularly preferably 135° C. or higher and 155° C. or lower. A temperature-raising rate is not particularly limited as long as it is adjusted such that the highest temperature during the temperature-raising does not exceed 300° C., and the temperature-raising rate is, for example, 1° C./min or higher and 50° C./min or lower.

The temperature at which the heat treatment is performed in the synthesis step is preferably 125° C. or higher and 200° C. or lower, more preferably 125° C. or higher and 175° C. or lower, still more preferably 130° C. or higher and 160° C. or lower, particularly preferably 135° C. or higher and 155° C. or lower. The duration of the heat treatment in the synthesis step may be, for example, 3 seconds or longer, and it is preferably 1 minute or longer, more preferably 10 minutes or longer. Further, the duration of the heat treatment may be, for example, 60 minutes or shorter. The duration of the heat treatment in the synthesis step is defined that it starts at the time when the temperature reaches a temperature set in the above-described range (e.g., at the time when the temperature reaches 150° C. in a case where the set temperature is 150° C.), and ends at the time when an operation for lowering the temperature is carried out.

The atmosphere of the heat treatment in the method of producing semiconductor nanoparticles is preferably an inert atmosphere, particularly an argon atmosphere or a nitrogen atmosphere. By using an inert atmosphere, the generation of an oxide as a by-product as well as the oxidation of the surfaces of the resulting semiconductor nanoparticles may be reduced or prevented.

The method of producing semiconductor nanoparticles may further comprise, after the above-described synthesis step, the cooling step of lowering the temperature of a dispersion containing the resulting semiconductor nanoparticles. The cooling step starts at the time when an operation for lowering the temperature is carried out, and ends at the time when the dispersion is cooled to 50° C. or lower.

From the standpoint of inhibiting the generation of silver sulfide from unreacted Ag salt, the cooling step preferably includes a period in which the temperature lowering rate is 50° C./min or higher. The temperature lowering rate is preferably 50° C./min or higher particularly at the time when the temperature starts to decrease after the operation for lowering the temperature is carried out.

The atmosphere of the cooling step is preferably an inert atmosphere, particularly an argon atmosphere or a nitrogen atmosphere. By using an inert atmosphere, the generation of an oxide as a by-product as well as the oxidation of the surfaces of the resulting semiconductor nanoparticles may be reduced or prevented.

The method of producing semiconductor nanoparticles may also comprise the separation step of separating the semiconductor nanoparticles from the dispersion, and may further comprise the purification step as required. In the separation step, for example, the dispersion containing the semiconductor nanoparticles may be centrifuged to recover the resulting supernatant containing the semiconductor nanoparticles. In the purification step, for example, an appropriate organic solvent such as an alcohol may be added to the supernatant obtained in the separation step, and the resultant may be subsequently centrifuged to recover the semiconductor nanoparticles as a precipitate. The semiconductor nanoparticles can also be recovered by vaporizing the organic solvent from the supernatant. The thus recovered precipitate may be dried by, for example, vacuum degassing, air drying, or a combination of vacuum degassing and air drying. The air drying may be performed by, for example, leaving the precipitate in the atmosphere at normal temperature and normal pressure and, in this case, the precipitate may be left to stand for 20 hours or longer, for example, about 30 hours. Further, the recovered precipitate may be dispersed in an appropriate organic solvent.

In the method of producing semiconductor nanoparticles serving as cores, the purification step that comprises addition of an organic solvent such as an alcohol and centrifugation may be performed multiple times as required. As the alcohol used for purification, a lower alcohol having 1 to 4 carbon atoms, such as methanol, ethanol, or n-propyl alcohol may be used. When the precipitate is dispersed in an organic solvent, for example, a halogen-based solvent such as chloroform, dichloromethane, dichloroethane, trichloroethane, or tetrachloroethane, or a hydrocarbon-based solvent such as toluene, cyclohexane, hexane, pentane, or octane may be used as the organic solvent. From the standpoint of quantum yield, the organic solvent used for dispersing the precipitate may be a halogen-based solvent.

Method of Producing Core-Shell Semiconductor Nanoparticles

A method of producing core-shell semiconductor nanoparticles comprises: the second providing step of obtaining a second mixture by mixing the semiconductor nanoparticles obtained by the above-described method of producing semiconductor nanoparticles, a compound containing a Group 13 element, and a simple substance of a Group 16 element or a compound containing a Group 16 element; and the shell-forming step of performing a heat treatment of the second mixture to obtain core-shell semiconductor nanoparticles (hereinafter, also referred to as "second heat treatment step"). In other words, the method of producing core-shell semiconductor nanoparticles may comprise: the first providing step of obtaining a first mixture that contains a Ag salt, an In salt, a compound containing Ga and S, and an organic solvent; the heat treatment step of performing a heat treatment of the first mixture at a temperature in a range of 125° C. or higher and 300° C. or lower to obtain semiconductor nanoparticles; the second providing step of obtaining a second mixture that contains the thus obtained semiconductor nanoparticles, a compound containing a Group 13 element, and a simple substance of a Group 16 element or a compound containing a Group 16 element; and the shell-forming step of performing a heat treatment of the second mixture to obtain core-shell semiconductor nanoparticles. In this method of producing core-shell semiconductor nanoparticles, the semiconductor nanoparticles obtained by the above-described method of producing semiconductor nanoparticles are used as cores, and a shell that may be composed of substantially a Group 13 element and a Group 16 element is formed on the surface of each core. The semiconductor nanoparticles used as cores may be used in the form of a dispersion.

In a liquid in which semiconductor nanoparticles are dispersed, light is not scattered; therefore, the dispersion is generally obtained as a transparent (colored or colorless) dispersion. A solvent in which the semiconductor nanoparticles are dispersed may be any organic solvent as in the production of the semiconductor nanoparticles, and the organic solvent may be a surface modifier, or a solution containing a surface modifier. The organic solvent can be, for example: at least one selected from nitrogen-containing compounds containing a hydrocarbon group having 4 or more and 20 or less carbon atoms, which are the surface modifiers described above in relation to the method of producing semiconductor nanoparticles; at least one selected from sulfur-containing compounds containing a hydrocarbon group having 4 or more and 20 or less carbon atoms; or a combination of at least one selected from nitrogen-containing compounds containing a hydrocarbon group having 4 or more and 20 or less carbon atoms and at least one selected from sulfur-containing compounds containing a hydrocarbon group having 4 or more and 20 or less carbon atoms. As the nitrogen-containing compounds, those having a high purity are particularly preferred since such nitrogen-containing compounds are readily available and have a boiling point of higher than 290° C., which is higher than the reaction temperature, and specific examples of the organic solvent include oleylamine, n-tetradecylamine, dodecanethiol, and a combination thereof.

The solvent in which the semiconductor nanoparticles are dispersed may contain a halogen-based solvent such as chloroform, or may be substantially a halogen-based solvent. A dispersion of the semiconductor nanoparticles may be obtained by dispersing the semiconductor nanoparticles in a halogen-based solvent, and subsequently replacing the solvent with an organic solvent containing a surface modifier, such as a nitrogen-containing compound. The replacement of the solvent may be performed by, for example, adding a surface modifier to the dispersion of the semiconductor nanoparticles that contains the halogen-based solvent, and subsequently removing the halogen-based solvent at least partially. Specifically, for example, the dispersion that contains the halogen-based solvent and the surface modifier is heat-treated under reduced pressure to remove the halogen-based solvent at least partially, whereby a dispersion of the semiconductor nanoparticles that contains the surface modifier can be obtained. The reduced pressure condition and the heat-treating temperature in the heat treatment performed under reduced pressure may be set such that the halogen-based solvent is at least partially removed while the surface modifier remains. Specifically, the reduced pressure condition may be, for example, 1 Pa or higher and 2,000 Pa or lower, and it is preferably 50 Pa or higher and 500 Pa or lower. Further, the heat-treating temperature may be, for example, 20° C. or higher and 120° C. or lower, and it is preferably 50° C. or higher and 80° C. or lower.

The dispersion of the semiconductor nanoparticles may be prepared such that the concentration of the particles in the dispersion is, for example, $5.0 \times 10^{-7}$ mol/L or higher and $5.0 \times 10^{-5}$ mol/L or lower, particularly $1.0 \times 10^{-6}$ mol/L or higher and $1.0 \times 10^{-5}$ mol/L or lower. When the ratio of the particles in the dispersion is excessively low, it is difficult to recover the product by an aggregation and precipitation process using a poor solvent, whereas when the ratio is excessively high, the rate of fusion of the core-forming materials through Ostwald ripening and collision is increased, and this tends to result in a broader particle size distribution.

The compound containing a Group 13 element serves as a Group 13 element source, and examples thereof include organic salts, inorganic salts, and organic metal compounds of Group 13 elements. Examples of the compound containing a Group 13 element include nitrates, acetates, sulfates, hydrochlorides, sulfonates, and acetylacetonate complexes, among which organic salts such as acetates, and organic metal compounds are preferred. This is because organic salts and organic metal compounds are highly soluble in organic solvents and thus likely to allow reaction to proceed more uniformly. Examples of the Group 13 element include aluminum (Al), gallium (Ga), indium (In), and thallium (Tl), and at least one selected from the group consisting of these elements is preferred.

The simple substance of a Group 16 element or the compound containing a Group 16 element serves as a Group 16 element source. For example, when sulfur (S) is a constituent element of the shell, a simple substance of sulfur such as high-purity sulfur can be used as the Group 16 element, or a sulfur-containing compound, examples of which include: thiols such as n-butanethiol, isobutanethiol, n-pentanethiol, n-hexanethiol, octanethiol, decanethiol, dodecanethiol, hexadecanethiol, and octadecanethiol; disulfides such as dibenzyl sulfide; thiourea; alkylthioureas such as 1,3-dimethylthiourea; and thiocarbonyl compounds, can be used. Particularly, when an alkylthiourea such as 1,3-dimethylthiourea is used as a Group 16 element source (S source), the shell is sufficiently formed, so that semiconductor nanoparticles exhibiting strong band-edge emission are likely to be obtained.

When oxygen (O) is a constituent element of the shell as a Group 16 element, an oxygen source is specifically, for example, an oxygen atom-containing compound or an oxygen atom-containing gas. Examples of the oxygen atom-containing compound include water, alcohols, ethers, carboxylic acids, ketones, and N-oxide compounds, and at least one selected from the group consisting of these compounds is preferred. Examples of the oxygen atom-containing gas include oxygen gas and ozone gas, and at least one selected from the group consisting of these gases is preferred. An oxygen source may be added by dissolving or dispersing the oxygen atom-containing compound in the second mixture that is a mixture used for shell formation, or by blowing the oxygen atom-containing gas into the second mixture. When selenium (Se) is a constituent element of the shell as a Group 16 element, a simple substance of selenium or a compound such as phosphine selenium oxide, an organic selenium compound (e.g., dibenzyl diselenide or diphenyl diselenide), or a hydride thereof may be used as the Group 16 element source. When tellurium (Te) is a constituent element of the shell as a Group 16 element, a simple substance of tellurium, phosphine tellurium oxide, or a hydride thereof may be used as the Group 16 element source.

The second mixture may further contain an alkali metal salt as required. The details of the alkali metal salt are as described above. When the second mixture contains an alkali metal salt, a ratio of the number of alkali metal atoms with respect to a sum of the number of alkali metal atoms and the number of Group 13 element atoms in the second mixture may be, for example, 0.01 or higher but lower than 1, or 0.1 or higher and 0.9 or lower. Further, a ratio of the number of Group 16 element atoms with respect to a sum of the number of alkali metal atoms and the number of Group 13 element atoms in the second mixture may be, for example, 0.25 or higher and 0.75 or lower.

In the shell-forming step, shell layers may be formed by a method in which: the temperature of the dispersion containing the semiconductor nanoparticles serving as cores is raised such that a peak temperature thereof is 200° C. or higher and 310° C. or lower; once the temperature of the dispersion reached the peak temperature, a mixed solution, which is prepared in advance by dispersing or dissolving a Group 13 element source, a Group 16 element source and, as required, an alkali metal salt in an organic solvent, is added to the dispersion in small portions with the peak temperature being maintained; and the temperature is subsequently lowered (slow injection method). In this case, a heat treatment proceeds immediately after the second mixture is obtained as a result of mixing the dispersion containing the semiconductor nanoparticles and the mixed solution. The mixed solution may be added at a rate of 0.1 mL/hr or higher and 10 mL/hr or lower, particularly 1 mL/hr or higher and 5 mL/hr or lower. As required, the peak temperature may be maintained even after the completion of the addition of the mixed solution.

When the peak temperature is equal to or higher than the above-described temperature, because of, for example, sufficient removal of the surface modifier modifying the semiconductor nanoparticles or sufficient progress of the chemical reaction for the shell formation, the formation of semiconductor layers (shells) tends to proceed sufficiently. When the peak temperature is equal to or lower than the above-described temperature, a change in the properties of the semiconductor nanoparticles is inhibited, so that favorable band-edge emission tends to be obtained. The duration of maintaining the peak temperature can be set at a total of 1 minute or longer and 300 minutes or shorter, particularly 10 minutes or longer and 120 minutes or shorter, after the start of the addition of the mixed solution. This retention time of the peak temperature is selected in relation to the peak temperature. The retention time is extended when the peak temperature is lower, while the retention time is shortened when the peak temperature is higher, whereby favorable shell layers are likely to be formed. A temperature-raising rate and a temperature-lowering rate are not particularly limited, and the temperature may be lowered by, for example, stopping heating with a heat source (e.g., an electric heater) and thereby allowing the resultant to cool after maintaining the peak temperature for a prescribed time.

Alternatively, in the shell-forming step, semiconductor layers serving as shells may be formed on the surfaces of semiconductor nanoparticles serving as cores by mixing the dispersion containing the semiconductor nanoparticles with a Group 13 element source, a Group 16 element source and, as required, an alkali metal salt to obtain the second mixture, and subsequently heat-treating the second mixture (heating-up method). Specifically, heating may be performed by slowly raising the temperature of the second mixture such that a peak temperature thereof is 200° C. or higher and 310° C. or lower, maintaining the peak temperature for 1 minute or longer and 300 minutes or shorter, and then slowly lowering the temperature. The temperature-raising rate may be, for example, 1° C./min or higher and 50° C./min or lower; however, in order to minimize a change in the properties of the cores caused by continuous heat treatment in the absence of shells, the temperature-raising rate is preferably 50° C./min or higher and 100° C./min or lower until the temperature reaches 200° C. In the case of further raising the temperature to beyond 200° C., the subsequent temperature-raising rate is preferably set at 1° C./min or higher and 5° C./min or lower. The temperature lowering rate may be, for example, 1° C./min or higher and 50° C./min or lower. The advantages of maintaining the peak temperature in the above-prescribed range are as described above for the slow injection method.

According to the heating-up method, as compared to in a case of forming shells by the slow injection method, core-shell semiconductor nanoparticles that exhibit stronger band-edge emission tend to be obtained.

In either of the above methods, an addition ratio of the Group 13 element source and the Group 16 element source may be determined in correspondence to the stoichiometric composition ratio of a compound semiconductor composed of a Group 13 element and a Group 16 element, and the addition ratio does not necessarily have to be the stoichiometric composition ratio. For example, the addition ratio of the Group 16 element with respect to the Group 13 element may be 0.75 or higher and 1.5 or lower.

Further, in order to allow shells of a desired thickness to be formed on the semiconductor nanoparticles contained in the dispersion, addition amounts are selected taking into consideration of the amount of the semiconductor nanoparticles contained in the dispersion. For example, the addition amounts of the Group 13 element source and the Group 16 element source may be determined such that a compound semiconductor having a stoichiometric composition composed of a Group 13 element and a Group 16 element is generated in an amount of 1 μmol or more and 10 mmol or less, particularly 5 μmol or more and 1 mmol or less, with respect to 10 nmol of the semiconductor nanoparticles in terms of the amount of substance as particles. It is noted here that the "amount of substance as particles" refers to a molar amount assuming a single particle as a huge molecule, and is equal to a value obtained by dividing the number of the nanoparticles contained in the dispersion by Avogadro constant ($NA=6.022\times10^{23}$).

In the method of producing core-shell semiconductor nanoparticles, it is preferred to form shells containing indium sulfide or gallium sulfide by using indium acetate or gallium acetylacetonate as the Group 13 element source, and a simple substance of sulfur, thiourea, dibenzyl disulfide, or alkylthiourea as the Group 16 element source, along with a mixed solution of oleylamine and dodecanethiol, or an alkylamine or alkenylamine having 4 or more and 20 or less carbon atoms as an organic solvent.

Shells are formed in the above-described manner, and core-shell semiconductor nanoparticles having a core-shell structure are formed as a result. The thus obtained core-shell semiconductor nanoparticles may be separated from the solvent and, as required, may be further purified and dried. The methods of separation, purification, and drying are as described above in relation to the semiconductor nanoparticles; therefore, detailed description thereof is omitted here.

The shell surfaces of the core-shell semiconductor nanoparticles may be modified with a surface modifier. Specific examples of the surface modifier include an amino alcohol having 2 or more and 20 or less carbon atoms, an ionic surface modifier, a nonionic surface modifier, a nitrogen-containing compound containing a hydrocarbon group having 4 or more and 20 or less carbon atoms, a sulfur-containing compound containing a hydrocarbon group having 4 or more and 20 or less carbon atoms, an oxygen-containing compound containing a hydrocarbon group having 4 or more and 20 or less carbon atoms, and a phosphorus-containing compound containing a hydrocarbon group having 4 or more and 20 or less carbon atoms. These surface modifiers may be used in combination of two or more different kinds thereof.

The amino alcohol may be any compound as long as it has an amino group and an alcoholic hydroxyl group and contains a hydrocarbon group having 2 or more and 20 or less carbon atoms. The number of carbon atoms in the amino alcohol is preferably 10 or less, more preferably 6 or less. The hydrocarbon group constituting the amino alcohol may be derived from a hydrocarbon such as a linear, branched, or cyclic alkane, alkene, or alkyne. The expression "derived from a hydrocarbon" used herein means that the hydrocarbon group is formed by removing at least two hydrogen atoms from the hydrocarbon. Specific examples of the amino alcohol include amino ethanol, amino propanol, amino butanol, amino pentanol, amino hexanol, and amino octanol. It is believed that the amino group of the amino alcohol binds to the surface of the respective core-shell semiconductor nanoparticles and the hydroxyl group is exposed on the particle outermost surface on the opposite side, as a result of which the polarity of the core-shell semiconductor nanoparticles is changed, and the dispersibility in alcohol-based solvents (e.g., methanol, ethanol, propanol, and butanol) is improved.

Examples of the ionic surface modifier include nitrogen-containing compounds, sulfur-containing compounds, and oxygen-containing compounds, which contain an ionic functional group in the respective molecules. The ionic functional group may be either cationic or anionic, and the ionic surface modifier preferably contains at least a cationic group. With regard to specific examples of the surface modifier and a surface modification method, reference can be made to, for example, Chemistry Letters, Vol. 45, pp 898-900, 2016.

The ionic surface modifier may be, for example, a sulfur-containing compound containing a tertiary or quaternary alkylamino group. The number of carbon atoms of the alkyl group in the alkylamino group may be, for example, 1 or more and 4 or less. The sulfur-containing compound may also be an alkyl or alkenylthiol having 2 or more and 20 or less carbon atoms. Specific examples of the ionic surface modifier include hydrogen halides of dimethylaminoethanethiol, halogen salts of trimethylammonium ethanethiol, hydrogen halides of dimethylaminobutanethiol, and halogen salts of trimethylammonium butanethiol.

Examples of the nonionic surface modifier include nitrogen-containing compounds, sulfur-containing compounds, and oxygen-containing compounds, which have a nonionic functional group containing an alkylene glycol unit, an alkylene glycol monoalkyl ether unit, or the like. The number of carbon atoms of the alkylene group in the alkylene glycol unit may be, for example, 2 or more and 8 or less, and it is preferably 2 or more and 4 or less. Further, the number of repeating alkylene glycol units may be, for example, 1 or more and 20 or less, and it is preferably 2 or more and 10 or less. The nitrogen-containing compounds, the sulfur-containing compounds, and the oxygen-containing compounds, which are included in the nonionic surface modifier, may contain an amino group, a thiol group, and a hydroxy group, respectively. Specific examples of the nonionic surface modifier include methoxytriethyleneoxy ethanethiol, and methoxyhexaethyleneoxy ethanethiol.

Examples of the nitrogen-containing compound containing a hydrocarbon group having 4 or more and 20 or less carbon atoms include amines and amides. Examples of the sulfur-containing compound containing a hydrocarbon group having 4 or more and 20 or less carbon atoms include thiols. Examples of the oxygen-containing compound containing a hydrocarbon group having 4 or more and 20 or less carbon atoms include carboxylic acids, alcohols, ethers, aldehydes, and ketones. Examples of the phosphorus-containing compound containing a hydrocarbon group having 4 or more and 20 or less carbon atoms include trialkyl phosphines, triaryl phosphines, trialkyl phosphine oxides, and triaryl phosphine oxides.

A method of modifying the shell surfaces of the core-shell semiconductor nanoparticles may comprise the surface modification step of bringing the core-shell semiconductor nanoparticles into contact with the above-described surface modifier (hereinafter, also referred to as "specific surface modifier"), such as an amino alcohol having 2 or more and 20 or less carbon atoms, an ionic surface modifier, a nonionic surface modifier, a nitrogen-containing compound containing a hydrocarbon group having 4 to 20 carbon atoms, a sulfur-containing compound containing a hydrocarbon group having 4 or more and 20 or les carbon atoms, an oxygen-containing compound containing a hydrocarbon group having 4 or more and 20 or less carbon atoms, or a phosphorus-containing compound containing a hydrocarbon group having 4 or more and 20 or less carbon atoms.

In the surface modification step, the core-shell semiconductor nanoparticles may be brought into contact with the specific surface modifier by, for example, mixing the core-shell semiconductor nanoparticles and the specific surface modifier. In the surface modification step, a ratio of the amount of the specific surface modifier with respect to the core-shell semiconductor nanoparticles may be, for example, 0.1 mL or more, and it is preferably 0.5 mL or more and 10 mL or less, with respect to $1 \times 10^{-8}$ moles of the core-shell semiconductor nanoparticles. The temperature of the contact may be, for example, 0° C. or higher and 100° C. or less, and it is preferably 10° C. or higher and 80° C. or less. The duration of the contact may be, for example, 10 seconds or longer and 10 days or shorter, and it is preferably 1 minute or longer and 1 day or shorter. The atmosphere of the contact may be an inert atmosphere, and it is particularly preferably an argon atmosphere or a nitrogen atmosphere.

The method of producing semiconductor nanoparticles may take the following mode as well.

Method of Producing Semiconductor Nanoparticles

The method of producing semiconductor nanoparticles comprises the third step of performing a third heat treatment of a third mixture that contains a silver (Ag) salt, an indium (In) salt, a compound having a gallium (Ga)-sulfur (S) bond, a gallium halide, and an organic solvent to obtain third semiconductor nanoparticles. As required, the method of producing semiconductor nanoparticles may further comprise other steps in addition to the third step.

Third Step

The third step may comprise: the third mixing step of obtaining a third mixture that contains a Ag salt, an In salt, a compound having a Ga—S bond, a gallium halide, and an organic solvent; and the third heat treatment step of performing a third heat treatment of the thus obtained third mixture to obtain third semiconductor nanoparticles.

By using a compound having a Ga—S bond as a supply source of Ga and S that are included in the composition of the third semiconductor nanoparticles to be produced, it is made easy to control the composition of the third semiconductor nanoparticles. In addition, by using a gallium halide, it is made easy to control the particle size of the third semiconductor nanoparticles to be produced. Accordingly, it is believed that semiconductor nanoparticles that exhibit band-edge emission with a high purity can be efficiently produced by a one-pot process.

In the third mixing step, a third mixture is prepared by mixing a Ag salt, an In salt, a compound having a Ga—S bond, a gallium halide, and an organic solvent. A mixing method in the third mixing step may be selected as appropriate from those mixing methods that are usually employed.

The Ag salt and the In salt in the third mixture may each be either an organic acid salt or an inorganic acid salt. Specifically, examples of the inorganic acid salt include nitrates, sulfates, hydrochlorides, and sulfonates, and examples of the organic acid salt include formates, acetates, oxalates, and acetylacetonates. The Ag salt and the In salt may each be preferably at least one selected from the group consisting of these acid salts, and the Ag salt and the In salt may each be more preferably at least one selected from the group consisting of organic acid salts such as acetates and acetylacetonates since these salts are highly soluble in organic solvents and thus allow reaction to proceed more uniformly. The third mixture may contain each of the Ag salt and the In salt singly, or in combination of two or more of each of the Ag salt and the In salt.

The Ag salt in the third mixture may contain a compound having a Ag—S bond since this can inhibit the generation of silver sulfide as a by-product in the below-described third heat treatment step. The Ag—S bond may be any of a covalent bond, an ionic bond, a coordinate bond, and the like. Examples of the compound having a Ag—S bond include Ag salts of sulfur-containing compounds, and the compound having a Ag—S bond may be an organic acid salt, inorganic acid salt, organic metal compound or the like of Ag. Examples of the sulfur-containing compounds include thiocarbamic acid, dithiocarbamic acid, thiocarbonic acid ester, dithiocarbonic acid ester (xanthic acid), trithiocarbonic acid ester, thiocarboxylic acid, dithiocarboxylic acid, and derivatives thereof. Thereamong, at least one selected from the group consisting of xanthic acid and derivatives thereof is preferred since these compounds are decomposed at a relatively low temperature. Specific examples of the sulfur-containing compounds include aliphatic thiocarbamic acids, aliphatic dithiocarbamic acids, aliphatic thiocarbonic acid esters, aliphatic dithiocarbonic acid esters, aliphatic trithiocarbonic acid esters, aliphatic thiocarboxylic acids, and aliphatic dithiocarboxylic acids. Examples of the aliphatic groups in these sulfur-containing compounds include alkyl groups and alkenyl groups that have 1 to 12 carbon atoms. The aliphatic thiocarbamic acids may include dialkylthiocarbamic acids and the like, and the aliphatic dithiocarbamic acids may include dialkyldithiocarbamic acids and the like. The alkyl groups in the dialkylthiocarbamic acids and the dialkyldithiocarbamic acids may have, for example, 1 or more and 12 or less carbon atoms, preferably 1 or more and 4 or less carbon atoms. Two alkyl groups in the dialkylthiocarbamic acids and the dialkyldithiocarbamic acids may be the same or different. Specific examples of the compound having a Ag—S bond include silver dimethyldithiocarbamate, silver diethyldithiocarbamate (Ag(DDTC)), and silver ethyl xanthate (Ag(EX)).

The In salt in the third mixture may contain a compound having an In—S bond. The In—S bond may be any of a covalent bond, an ionic bond, a coordinate bond, and the like. Examples of the compound having an In—S bond include In salts of sulfur-containing compounds, and the compound having an In—S bond may be an organic acid salt, inorganic acid salt, organic metal compound or the like of In. Examples of the sulfur-containing compounds specifically include thiocarbamic acid, dithiocarbamic acid, thiocarbonic acid ester, dithiocarbonic acid ester (xanthic acid), trithiocarbonic acid ester, thiocarboxylic acid, dithiocarboxylic acid, and derivatives thereof. Thereamong, at least one selected from the group consisting of xanthic acid and derivatives thereof is preferred since these compounds are decomposed at a relatively low temperature. Specific examples of the sulfur-containing compounds are the same as described above. Specific examples of the compound having an In—S bond include indium tris(dimethyldithiocarbamate), indium tris(diethyldithiocarbamate) $(In(DDTC)_3)$, indium chloro-bis(diethyldithiocarbamate), and indium ethyl xanthate $(In(EX)_3)$.

In the compound having a Ga—S bond that is contained in the third mixture, the Ga—S bond may be any of a covalent bond, an ionic bond, a coordinate bond, and the like. Examples of the compound having a Ga—S bond include Ga salts of sulfur-containing compounds, and the compound having a Ga—S bond may be an organic acid salt, inorganic acid salt, organic metal compound or the like of Ga. Examples of the sulfur-containing compounds specifically include thiocarbamic acid, dithiocarbamic acid, thiocarbonic acid ester, dithiocarbonic acid ester (xanthic acid), trithiocarbonic acid ester, thiocarboxylic acid, dithiocarboxylic acid, and derivatives thereof. Thereamong, at least one selected from the group consisting of xanthic acid and derivatives thereof is preferred since these compounds are decomposed at a relatively low temperature. Specific examples of the sulfur-containing compounds are the same as described above. Specific examples of the compound having a Ga—S bond include gallium tris(dimethyldithiocarbamate), gallium tris(diethyldithiocarbamate) (Ga(DDTC)$_3$), gallium chloro-bis(diethyldithiocarbamate), and gallium ethyl xanthate (Ga(EX)$_3$). In the third mixture, the compound having a Ga—S bond may be contained singly, or in combination of two or more thereof.

Examples of the gallium halide in the third mixture include gallium fluoride, gallium chloride, gallium bromide, and gallium iodide, and the third mixture may contain at least one selected from the group consisting of these gallium halides. Further, the gallium halide may contain at least gallium chloride. These gallium halides may be used singly, or in combination of two or more thereof.

Examples of the organic solvent in the third mixture include: amines containing a hydrocarbon group having 4 or more and 20 or less carbon atoms, such as alkylamines and alkenylamines having 4 or more and 20 or less carbon atoms; thiols containing a hydrocarbon group having 4 or more and 20 or less carbon atoms, such as alkylthiols and alkenylthiols having 4 or more and 20 or less carbon atoms; and phosphines containing a hydrocarbon group having 4 or more and 20 or less carbon atoms, such as alkylphosphines and alkenylphosphines having 4 or more and 20 or less carbon atoms, and the third mixture preferably contains at least one selected from the group consisting of these organic solvents. These organic solvents may, for example, eventually modify the surfaces of the resulting third semiconductor nanoparticles. These organic solvents may be used in combination of two or more thereof and, for example, a mixed solvent of a combination of at least one selected from thiols containing a hydrocarbon group having 4 or more and 20 or less carbon atoms and at least one selected from amines containing a hydrocarbon group having 4 or more and 20 or less carbon atoms may be used. These organic solvents may also be used as a mixture with other organic solvent. When the organic solvent contains any of the above-described thiols and any of the above-described amines, a content volume ratio of the thiol with respect to the amine (thiol/amine) is, for example, higher than 0 but 1 or lower, preferably 0.007 or higher and 0.2 or lower.

A content ratio of Ag, In, Ga, and S in the third mixture may be selected as appropriate in accordance with the intended composition. In this case, the content ratio of Ag, In, Ga, and S does not have to conform to a stoichiometric ratio. For example, a ratio (Ga/(In+Ga)) of the number of moles of Ga with respect to a total number of moles of In and Ga may be 0.2 or higher and 0.95 or lower, 0.4 or higher and 0.9 or lower, or 0.6 or higher and 0.9 or lower. In addition, for example, a ratio (Ag/(Ag+In+Ga)) of the number of moles of Ag with respect to a total number of moles of Ag, In, and Ga may be 0.05 or higher and 0.55 or lower. Further, for example, a ratio (S/(Ag+In+Ga)) of the number of moles of S with respect to a total number of moles of Ag, In, and Ga may be 0.6 or higher and 1.6 or lower.

The third mixture may further contain an alkali metal salt. Examples of the alkali metal ($M^a$) include lithium (Li), sodium (Na), potassium (K), rubidium (Rb), and cesium (Cs), and the third mixture preferably contains Li since Li has an ionic radius close to that of Ag. Examples of the alkali metal salt include organic acid salts and inorganic acid salts. Specifically, examples of the inorganic acid salts include nitrates, sulfates, hydrochlorides, and sulfonates, and examples of the organic acid salts include acetates and acetylacetonates. Thereamong, organic acid salts are preferred since they are highly soluble in organic solvents.

When the third mixture contains an alkali metal salt, a ratio ($M^a/(Ag+M^a)$) of the number of alkali metal atoms with respect to a total number of Ag and alkali metal atoms may be, for example, lower than 1, and it is preferably 0.8 or lower, more preferably 0.4 or lower, still more preferably 0.2 or lower. Further, this ratio may be, for example, higher than 0, and it is preferably 0.05 or higher, more preferably 0.1 or higher.

In the third mixture, a content molar ratio of the gallium halide with respect to the Ag salt may be, for example, 0.01 or higher and 1 or lower and, from the standpoint of internal quantum yield, it may be preferably 0.12 or higher and 0.45 or lower.

The concentration of the Ag salt in the third mixture may be, for example, 0.01 mmol/L or higher and 500 mmol/L or lower and, from the standpoint of internal quantum yield, it may be preferably 0.05 mmol/L or higher and 100 mmol/L or lower, more preferably 0.1 mmol/L or higher and 10 mmol/L or lower.

In the third heat treatment step, a third heat treatment of the third mixture is performed to obtain third semiconductor nanoparticles. The temperature of the third heat treatment may be, for example, 200° C. or higher and 320° C. or lower. The third heat treatment step may comprise: a temperature-raising step of raising the temperature of the third mixture to a temperature in a range of 200° C. or higher and 320° C. or lower; and the synthesis step of performing a heat treatment of the third mixture at a temperature in a range of 200° C. or higher and 320° C. or lower for a prescribed time.

The range to which the temperature is raised in the temperature-raising step of the third heat treatment step may be 200° C. or higher and 320° C. or lower, preferably 230° C. or higher and 290° C. or lower. A temperature-raising rate may be adjusted such that the highest temperature during the temperature raising does not exceed the intended temperature, and the temperature-raising rate is, for example, 1° C./min or higher and 50° C./min or lower.

The temperature of the heat treatment in the synthesis step of the third heat treatment step may be 200° C. or higher and 320° C. or lower, preferably 230° C. or higher and 290° C. or lower. The duration of the heat treatment in the synthesis step may be, for example, 3 seconds or longer, preferably 1 minute or longer, 10 minutes or longer, 30 minutes or longer, 60 minutes or longer, or 90 minutes or longer. Further, the duration of the heat treatment may be, for example, 300 minutes or shorter, preferably 180 minutes or shorter, or 150 minutes or shorter. The duration of the heat treatment in the synthesis step is defined that it starts at the time when the temperature reaches a temperature set in the above-described range (e.g., at the time when the temperature reaches 250° C. in a case where the set temperature is 250° C.), and ends at the time when an operation for lowering the temperature is carried out. By the synthesis step, a dispersion containing the third semiconductor nanoparticles can be obtained.

The atmosphere of the third heat treatment step is preferably an inert gas atmosphere, particularly an argon atmosphere or a nitrogen atmosphere. By using an inert gas atmosphere, the generation of an oxide as a by-product as well as the oxidation of the surfaces of the resulting third semiconductor nanoparticles may be reduced or prevented.

The method of producing semiconductor nanoparticles may further comprise, after the above-described synthesis step, the cooling step of lowering the temperature of a dispersion containing the resulting third semiconductor nanoparticles. The cooling step starts at the time when an operation for lowering the temperature is carried out, and ends at the time when the dispersion is cooled to 50° C. or lower.

From the standpoint of inhibiting the generation of silver sulfide from unreacted Ag salt, the cooling step may include a period in which the temperature lowering rate is 50° C./min or higher. The temperature lowering rate may be 50° C./min or higher particularly at the time when the temperature starts to decrease after the operation for lowering the temperature is carried out.

The atmosphere of the cooling step is preferably an inert gas atmosphere, particularly an argon atmosphere or a nitrogen atmosphere. By using an inert gas atmosphere, the generation of an oxide as a by-product as well as the oxidation of the surfaces of the resulting third semiconductor nanoparticles may be reduced or prevented.

The method of producing semiconductor nanoparticles may also comprise the separation step of separating the third semiconductor nanoparticles from the dispersion, and may further comprise the purification step as required. In the separation step, for example, the dispersion containing the third semiconductor nanoparticles may be centrifuged to recover the resulting supernatant containing the third semiconductor nanoparticles. In the purification step, for example, an appropriate organic solvent such as an alcohol may be added to the supernatant obtained in the separation step, and the resultant may be subsequently centrifuged to recover the third semiconductor nanoparticles as a precipitate. The third semiconductor nanoparticles can also be recovered by vaporizing the organic solvent from the supernatant. The thus recovered precipitate may be dried by, for example, vacuum degassing, air drying, or a combination of vacuum degassing and air drying. The air drying may be performed by, for example, leaving the precipitate in the atmosphere at normal temperature and normal pressure and, in this case, the precipitate may be left to stand for 20 hours or longer, for example, about 30 hours. Further, the recovered precipitate may be dispersed in an appropriate organic solvent.

In the method of producing semiconductor nanoparticles, the purification step that includes addition of an organic solvent such as an alcohol and centrifugation may be performed multiple times as required. As the alcohol used for purification, a lower alcohol having 1 to 4 carbon atoms, such as methanol, ethanol, or n-propyl alcohol may be used. When the precipitate is dispersed in an organic solvent, for example, a halogen-based solvent such as chloroform, dichloromethane, dichloroethane, trichloroethane, or tetrachloroethane, or a hydrocarbon-based solvent such as toluene, cyclohexane, hexane, pentane, or octane may be used as the organic solvent. From the standpoint of internal quantum yield, the organic solvent used for dispersing the precipitate may be a halogen-based solvent.

The third semiconductor nanoparticles obtained in the above-described manner may be in the state of a dispersion or a dry powder. The third semiconductor nanoparticles can exhibit band-edge emission with a high purity. The semiconductor nanoparticles obtained by the method of producing semiconductor nanoparticles may be the third semiconductor nanoparticles, or may be fourth semiconductor nanoparticles obtained after the below-described fourth step.

The method of producing semiconductor nanoparticles may further comprise the fourth step of performing a fourth heat treatment of a fourth mixture that contains the third semiconductor nanoparticles and a gallium halide to obtain fourth semiconductor nanoparticles.

Fourth Step

The fourth step may comprise: the fourth mixing step of obtaining a fourth mixture that contains the third semiconductor nanoparticles obtained in the above-described third step and a gallium halide; and the fourth heat treatment step of performing a fourth heat treatment of the thus obtained fourth mixture to obtain fourth semiconductor nanoparticles.

By performing the fourth heat treatment of the fourth mixture that contains the third semiconductor nanoparticles and a gallium halide, fourth semiconductor nanoparticles in which the band-edge emission purity and the internal quantum yield are further improved can be produced. The reasons for this are believed, for example, as follows.

It can be thought that the Ga moiety of the gallium halide reacts with Ga defects (e.g., Ga-deficient parts) of the semiconductor containing Ga and S (e.g., $GaS_x$; x is, for example 0.8 or more and 1.5 or less), which exists on the surfaces of the third semiconductor nanoparticles, to fill the Ga defects, and further reacts with S atoms existing in the reaction system, whereby the concentration of Ga and S in the vicinity of the Ga defects is increased and the Ga defects are compensated, as a result of which the band-edge emission purity and the internal quantum yield are improved. It can also be thought that the Ga atom of the gallium halide is coordinated to the S atoms on the surface of the semiconductor containing Ga and S which exists on the surfaces of the third semiconductor nanoparticles, and the halogen atom of the thus coordinated gallium halide reacts with S components existing in the reaction system, whereby the concentration of Ga and S in the vicinity of the surfaces is increased and the remaining surface defects are reduced, as a result of which the band-edge emission purity and the internal quantum yield are improved. Further, it can be thought that, when a compound having a Ga—S bond (e.g., gallium ethyl xanthate: $Ga(EX)_3$) is used as a raw material of the third semiconductor nanoparticles, xanthic acid partially remains in the resulting third semiconductor nanoparticles, and the gallium halide acts on the parts of the partially remaining xanthic acid to facilitate conversion into $GaS_x$, whereby the concentration of Ga and S in the vicinity of the surfaces is increased and the remaining surface defects are reduced, as a result of which the band-edge emission purity and the internal quantum yield are improved.

In the fourth mixing step, a fourth mixture is obtained by mixing the third semiconductor nanoparticles and a gallium halide. The fourth mixture may further contain an organic solvent. Examples of the organic solvent contained in the fourth mixture are the same as those exemplified above for the third step. When the fourth mixture contains an organic solvent, the fourth mixture may be prepared such that the concentration of the third semiconductor nanoparticles therein is, for example, $5.0 \times 10^{-7}$ mol/L or higher and $5.0 \times 10^{-5}$ mol/L or lower, particularly $1.0 \times 10^{-6}$ mol/L or higher and $1.0 \times 10^{-5}$ mol/L or lower. It is noted here that the concentration of the third semiconductor nanoparticles is set based on the amount of substance as particles. The "amount of substance as particles" refers to a molar amount assuming a single particle as a huge molecule, and is equal to a value obtained by dividing the number of the nanoparticles contained in a dispersion by Avogadro constant (NA=6.022×$10^{23}$).

Examples of the gallium halide in the fourth mixture may include gallium fluoride, gallium chloride, gallium bromide, and gallium iodide, and the fourth mixture may contain at least one selected from the group consisting of these gallium halides. Further, the gallium halide may contain at least gallium chloride. These gallium halides may be used singly, or in combination of two or more thereof.

In the fourth mixture, a content molar ratio of the gallium halide with respect to the third semiconductor nanoparticles may be, for example, 0.01 or higher and 50 or lower, and it is preferably 0.1 or higher and 10 or lower.

In the fourth heat treatment step, a fourth heat treatment of the fourth mixture is performed to obtain fourth semiconductor nanoparticles. The temperature of the fourth heat treatment may be, for example, 200° C. or higher and 320° C. or lower. The fourth heat treatment step may include: a temperature-raising step of raising the temperature of the fourth mixture to a temperature in a range of 200° C. or higher and 320° C. or lower; and the modification step of performing a heat treatment of the fourth mixture at a temperature in a range of 200° C. or higher and 320° C. or lower for a prescribed time.

The fourth heat treatment step may further comprise, prior to the temperature-raising step, the pre-heat treatment step of performing a heat treatment of the fourth mixture at a temperature of 60° C. or higher and 100° C. or lower. In the pre-heat treatment step, the temperature of the heat treatment may be, for example, 70° C. or higher and 90° C. or lower. The duration of the heat treatment in the pre-heat treatment step may be, for example, 1 minute or longer and 30 minutes or shorter, preferably 5 minutes or longer and 20 minutes or shorter.

The range to which the temperature is raised in the temperature-raising step of the fourth heat treatment step may be 200° C. or higher and 320° C. or lower, preferably 230° C. or higher and 290° C. or lower. A temperature-raising rate may be adjusted such that the highest temperature during the temperature raising does not exceed the intended temperature, and the temperature-raising rate is, for example, 1° C./min or higher and 50° C./min or lower.

The temperature of the heat treatment in the modification step of the fourth heat treatment step may be 200° C. or higher and 320° C. or lower, preferably 230° C. or higher and 290° C. or lower. The duration of the heat treatment in the modification step may be, for example, 3 seconds or longer, preferably 1 minute or longer, 10 minutes or longer, 30 minutes or longer, 60 minutes or longer, or 90 minutes or longer. Further, the duration of the heat treatment may be, for example, 300 minutes or shorter, preferably 180 minutes or shorter, or 150 minutes or shorter. The duration of the heat treatment in the modification step is defined that it starts at the time when the temperature reaches a temperature set in the above-described range (e.g., at the time when the temperature reaches 250° C. in a case where the set temperature is 250° C.), and ends at the time when an operation for lowering the temperature is carried out.

The atmosphere of the fourth heat treatment step is preferably an inert gas atmosphere, particularly an argon atmosphere or a nitrogen atmosphere. By using an inert gas atmosphere, the generation of an oxide as a by-product as well as the oxidation of the surfaces of the resulting fourth semiconductor nanoparticles may be reduced or prevented.

The method of producing semiconductor nanoparticles may further comprise, after the above-described modification step, the cooling step of lowering the temperature of a dispersion containing the resulting fourth semiconductor nanoparticles. The cooling step starts at the time when an operation for lowering the temperature is carried out, and ends at the time when the dispersion is cooled to 50° C. or lower.

The cooling step may include a period in which the temperature lowering rate is 50° C./min or higher. The temperature lowering rate may be 50° C./min or higher particularly at the time when the temperature starts to decrease after the operation for lowering the temperature is carried out.

The atmosphere of the cooling step is preferably an inert gas atmosphere, particularly an argon atmosphere or a nitrogen atmosphere. By using an inert gas atmosphere, the generation of an oxide as a by-product as well as the oxidation of the surfaces of the resulting fourth semiconductor nanoparticles may be reduced or prevented.

The method of producing semiconductor nanoparticles may also comprise the separation step of separating the fourth semiconductor nanoparticles from the dispersion, and may further comprise the purification step as required. The separation step and the purification step are as described above in relation to the third semiconductor nanoparticles; therefore, detailed description thereof is omitted here.

The method of producing semiconductor nanoparticles may further comprise the surface modification step. The surface modification step may comprise bringing the resulting fourth semiconductor nanoparticles into contact with a surface modifier.

In the surface modification step, the fourth semiconductor nanoparticles may be brought into contact with the surface modifier by, for example, mixing the fourth semiconductor nanoparticles and the surface modifier. In the surface modification step, a ratio of the amount of the surface modifier with respect to the fourth semiconductor nanoparticles may be, for example, $1 \times 10^{-8}$ moles or more, and it is preferably $2 \times 10^{-8}$ moles or more and $5 \times 10^{-8}$ moles or less, with respect to $1 \times 10^{-8}$ moles of the fourth semiconductor nanoparticles. The temperature of the contact may be, for example, 0° C. or higher and 300° C. or lower, and it is preferably 10° C. or higher and 300° C. or lower. The duration of the contact may be, for example, 10 seconds or longer and 10 days or shorter, and it is preferably 1 minute or longer and 1 day or shorter. The atmosphere of the contact may be an inert gas atmosphere, and it is particularly preferably an argon atmosphere or a nitrogen atmosphere.

Specific examples of the surface modifier used in the surface modification step include an amino alcohol having 2 or more and 20 or less carbon atoms, an ionic surface modifier, a nonionic surface modifier, a nitrogen-containing compound containing a hydrocarbon group having 4 or more and 20 or less carbon atoms, a sulfur-containing compound containing a hydrocarbon group having 4 or more and 20 or less carbon atoms, an oxygen-containing compound containing a hydrocarbon group having 4 or more and 20 or less carbon atoms, a phosphorus-containing compound containing a hydrocarbon group having 4 or more and 20 or less carbon atoms, and a halide of a Group 2, 12, or 13 element. These surface modifiers may be used singly, or in combination of two or more different kinds thereof. The details of these surface modifiers are as described above.

Luminescent Material

A luminescent material may contain the above-described core-shell semiconductor nanoparticles, and a metal compound in which the core-shell semiconductor nanoparticles are embedded. The metal compound in which the core-shell semiconductor nanoparticles are embedded may contain at least one of Zn and Ga, and at least one of S and O.

By constituting a luminescent material from core-shell semiconductor nanoparticles having a specific configuration and a specific metal compound in which the core-shell semiconductor nanoparticles are embedded, the durability of the luminescent material is improved, and deterioration of the luminescent characteristics of the luminescent material, which is caused by water, oxygen and the like in the environment, is inhibited. The metal compound is believed to function as, for example, a matrix in which the core-shell semiconductor nanoparticles are embedded.

The core-shell semiconductor nanoparticles are at least partially embedded in the metal compound to constitute the luminescent material. In the luminescent material, plural particles may be embedded in the metal compound in an aggregated state, or individual particles may be embedded independently from one another in the metal compound.

Figure 12:
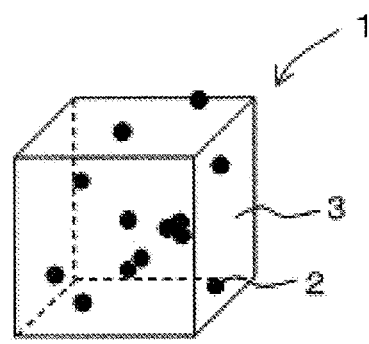
FIG. 12 is a schematic drawing that illustrates a light emitting material containing a metal compound in which core-shell semiconductor nanoparticles are embedded.

A configuration example of the luminescent material will now be described referring to a drawing. FIG. 12 is a drawing that schematically illustrates one example of a luminescent material 1. The luminescent material 1 is constituted by core-shell semiconductor nanoparticles 2, and a metal compound 3 in which the core-shell semiconductor nanoparticles 2 are embedded. In FIG. 12, the core-shell semiconductor nanoparticles 2 are embedded in the metal compound 3, which serves as a matrix, in the form of individual particles or aggregated particles. Some of the core-shell semiconductor nanoparticles 2 may be partially exposed from the surface of the metal compound 3. In FIG. 12, for the sake of simplicity, the core-shell semiconductor nanoparticles 2 have a spherical shape; however, the shape of the core-shell semiconductor nanoparticles is not limited to a spherical shape. Further, in FIG. 12, the metal compound 3 is illustrated to have a cubic shape; however, the shape of the metal compound 3 is not limited to a cubic shape.

A content ratio of the core-shell semiconductor nanoparticles in the luminescent material may be, for example, 0.01% by mass or more and 10% by mass or less, and it is preferably 0.1% by mass or more and 5% by mass or less, with respect to a total mass of the luminescent material.

The metal compound constituting the luminescent material contains at least one of Zn and Ga, and at least one of S and O, and the core-shell semiconductor nanoparticles are embedded therein. The metal compound may be substantially a compound that is composed of at least one of Zn and Ga, and at least one of S and O. The term "substantially" used herein indicates that, when a total number of atoms of all elements contained in the metal compound is taken as 100%, a ratio of the number of atoms of elements other than Zn, Ga, S, and O is, for example, 10% or less, preferably 5% or less, more preferably 3% or less, particularly preferably 1% or less. The ratio of each element contained in the metal compound can be verified by, for example, ICP emission analysis for Zn, Ga, and S, or by elemental analysis based on a combustion method for O. The metal compound may also contain at least one selected from the group consisting of a metal sulfide, a metal oxysulfide, and a metal oxide. Whether or not the metal compound contains at least one selected from the group consisting of a metal sulfide, a metal oxysulfide, and a metal oxide can be verified by, for example, SEM-EPMA.

The metal sulfide may contain at least one of Zn and Ga, along with S. When the metal sulfide is formed of substantially Zn and S, the metal sulfide may have a composition represented by ZnS. The term "substantially" used herein indicates that, when a total number of atoms of all elements contained in the metal sulfide is taken as 100%, a ratio of the number of atoms of elements other than Zn and S is, for example, 5% or less, preferably 3% or less, more preferably 1% or less. Meanwhile, when the metal sulfide is formed of substantially Ga and S, the metal sulfide may have a composition represented by $Ga_2S_3$. The term "substantially" used herein indicates that, when a total number of atoms of all elements contained in the metal sulfide is taken as 100%, a ratio of the number of atoms of elements other than Ga and S is, for example, 5% or less, preferably 3% or less, more preferably 1% or less.

The metal oxysulfide may contain at least one of Zn and Ga, along with S and O. For example, when the metal oxysulfide is formed of substantially Zn, S, and 0, the metal oxysulfide may have a composition represented by $ZnO_xS_{(1-x)}$ (0<x<1). The term "substantially" used herein indicates that, when a total number of atoms of all elements contained in the metal oxysulfide is taken as 100%, a ratio of the number of atoms of elements other than Zn, S, and O is, for example, 5% or less, preferably 3% or less, more preferably 1% or less. Meanwhile, when the metal oxysulfide is formed of substantially Ga, S, and 0, the metal oxysulfide may have a composition represented by $Ga_2O_xS_{(3-x)}$ (0<x<3). The term "substantially" used herein indicates that, when a total number of atoms of all elements contained in the metal oxysulfide is taken as 100%, a ratio of the number of atoms of elements other than Ga, S, and O is, for example, 5% or less, preferably 3% or less, more preferably 1% or less.

The metal oxide may contain at least one of Zn and Ga, along with O. For example, when the metal oxide is formed of substantially Zn and O, the metal oxide may have a composition represented by ZnO. The term "substantially" used herein indicates that, when a total number of atoms of all elements contained in the metal oxide is taken as 100%, a ratio of the number of atoms of elements other than Zn and O is, for example, 5% or less, preferably 3% or less, more preferably 1% or less. Meanwhile, when the metal oxide is formed of substantially Ga and O, the metal oxide may have a composition represented by $Ga_2O_3$. The term "substantially" used herein indicates that, when a total number of atoms of all elements contained in the metal oxide is taken as 100%, a ratio of the number of atoms of elements other than Ga and O is, for example, 5% or less, preferably 3% or less, more preferably 1% or less.

The metal compound in which the core-shell semiconductor nanoparticles are embedded may be, as described below, a compound generated by a solution reaction. The metal compound may also be a solvolysis product obtained by, for example, reacting an organic or inorganic acid salt of a metal with at least one of a sulfur-containing compound and an oxygen-containing compound at a low temperature of 100° C. or lower in the presence of water, alcohol, or the like. The metal compound may be crystalline or amorphous. The crystal state of the metal compound can be verified by, for example, X-ray diffractometry.

Method of Producing Luminescent Material

A method of producing a luminescent material comprises: the providing step of providing the above-described core-shell semiconductor nanoparticles; the mixing step of obtaining a luminescent material mixture which contains the core-shell semiconductor nanoparticles, a compound containing at least one of Zn and Ga, a compound containing at least one of S and O, and a solvent; and the synthesis step of obtaining, from the luminescent material mixture, a metal compound which contains at least one of Zn and Ga and at least one of S and O and in which the core-shell semiconductor nanoparticles are embedded.

By allowing the compound containing at least one of Zn and Ga and the compound containing at least one of S and O to react with each other via the solvent in the presence of the core-shell semiconductor nanoparticles, a metal compound that contains at least one of Zn and Ga as a metal is precipitated. This metal compound is precipitates in such a manner that the core-shell semiconductor nanoparticles are embedded therein; therefore, a luminescent material may be efficiently produced by a solution reaction.

Mixing Step

In the mixing step of the method of producing a luminescent material, a luminescent material mixture is obtained by mixing the core-shell semiconductor nanoparticles with a compound containing at least one of Zn and Ga, a compound containing at least one of S and O, and a solvent. The core-shell semiconductor nanoparticles used in the mixing step may be in the form of a dispersion.

Examples of the compound containing at least one of Zn and Ga include organic acid salts and inorganic acid salts that contain at least one of Zn and Ga. Specifically, examples of the inorganic acid salts include nitrates, sulfates, hydrochlorides, sulfonates, and carbonates, and examples of the organic acid salts include acetates and acetylacetonates. Thereamong, organic acid salts are preferred since they are highly soluble in organic solvents. Examples of an S-containing compound include thioamides such as thioacetamide, in addition to the above-described sulfur-containing compounds. Examples of an O-containing compound include water, alcohols, and amino alcohols.

The solvent is, for example, water, an alcohol having 1 or more and 8 or less carbon atoms, an alkylene glycol having 2 or more and 8 or less carbon atoms, or other polyol such as glycerol. Specific examples of the alcohol include methanol, ethanol, propanol, isopropanol, butanol, isobutanol, hexanol, octanol, and 2-ethylhexanol. The solvent may be a mixed solvent of water and an alcohol; however, it is preferably substantially an alcohol since deterioration of the core-shell semiconductor nanoparticles can thereby be inhibited. The term "substantially" used herein indicates that the content of components other than the alcohol is, for example, 5% by weight or less, preferably 1% by weight or less, more preferably 0.5% by weight or less.

The content of the core-shell semiconductor nanoparticles in the luminescent material mixture may be, for example, 10 nmol/L or higher and 10 µmol/L or lower, and it is preferably 100 nmol/L or higher and 1 µmol/L or lower, in terms of concentration based on the amount of substance as nanoparticles (number of particles). The content of the compound containing at least one of Zn and Ga in the luminescent material mixture may be, for example, 1 mmol/L or higher and 1 mol/L or lower, and it is preferably 10 mmol/L or higher and 200 mmol/L or lower. The content of the compound containing at least one of S and 0 in the luminescent material mixture may be, 1 mmol/L or higher and 1 mol/L or lower, and it is preferably 10 mmol/L or higher and 200 mmol/L or lower.

In the luminescent material mixture, a molar ratio of the content of the compound containing at least one of S and O with respect to the content of the compound containing at least one of Zn and Ga may be, for example, 0.1 or more and 10 or less, preferably 0.5 or more and 2 or less.

In the mixing step, the luminescent material mixture can be obtained by, for example, adding the compound containing at least one of S and O to a mixture of a solution that contains the compound containing at least one of Zn and Ga and a dispersion of the core-shell semiconductor nanoparticles. Alternatively, the luminescent material mixture may be obtained by adding the compound containing at least one of Zn and Ga to a mixture of a solution that contains the compound containing at least one of S and O and a dispersion of the core-shell semiconductor nanoparticles. The temperature of the mixing may be, for example, 0° C. or higher and 100° C. or less, and it is preferably 10° C. or higher and 80° C. or less. The atmosphere of the mixing may be, for example, an inert atmosphere and, when an alcohol is used alone as the solvent, the atmosphere is more preferably a dehydrating atmosphere.

The method of producing a luminescent material may also comprise the surface modification step of bringing the core-shell semiconductor nanoparticles into contact with a specific surface modifier. By using the core-shell semiconductor nanoparticles that have been subjected to this surface modification step, the dispersibility of the core-shell semiconductor nanoparticles in the luminescent material mixture can be further improved, so that a luminescent material that exhibits superior durability can be obtained.

Luminescent Material Synthesis Step

In the luminescent material synthesis step, a metal compound which contains at least one of Zn and Ga and at least one of S and O and in which the core-shell semiconductor nanoparticles are embedded is obtained from the luminescent material mixture. By a synthesis reaction involving solvolysis (so-called sol-gel method), the metal compound is precipitated from the luminescent material mixture, with the core-shell semiconductor nanoparticles being embedded in the metal compound.

In the luminescent material synthesis step, the metal compound may be precipitated, for example, at room temperature (e.g., 25° C.), or by performing a heat treatment. The temperature of the heat treatment may be, for example, lower than 100° C., and it is preferably 80° C. or lower, more preferably 60° C. or lower. Further, the temperature of the heat treatment may be 0° C. or higher, and it is preferably 30° C. or higher. The time required for the synthesis step may be, for example, 1 minute or longer, and it is preferably 10 minutes or longer. Further, the time required for the synthesis step may be, for example, 10 days or shorter, and it is preferably 3 days or shorter. The atmosphere of the synthesis step is preferably an inert atmosphere, particularly an argon atmosphere or a nitrogen atmosphere. By using an inert atmosphere, a luminescent material having superior emission characteristics can be obtained. When an alcohol is used alone as the solvent, the atmosphere of the synthesis step may be a dehydrating atmosphere as well.

In the luminescent material synthesis step, the embedding rate of the core-shell semiconductor nanoparticles into the metal compound may be, for example, 10% or higher, and it is preferably 80% or higher. The embedding rate is determined by dividing the amount of the core-shell semiconductor nanoparticles contained in the precipitated metal compound by the amount of the core-shell semiconductor nanoparticles added to the luminescent material mixture.

The method of producing a luminescent material may also comprise the separation step of separating the metal compound generated in the synthesis from the solvent, and may further comprise the purification step as required. In the separation step, for example, a reaction solution containing a luminescent material may be centrifuged to recover the luminescent material as a precipitate. Alternatively, a precipitate of the luminescent material may be recovered by a solid-liquid separation means such as filtration. In the purification step, for example, the precipitate obtained in the separation step may be washed with an organic solvent such as an alcohol, and the thus washed precipitate may be subjected to a drying treatment.

Light Emitting Device

A light emitting device comprises: a light conversion member; and a light source having an emission peak wavelength in a range of the ultraviolet region to the visible light region, and the light conversion member contains at least either of the above-described core-shell semiconductor nanoparticles and luminescent material. According to this light emitting device, for example, the core-shell semiconductor nanoparticles or the luminescent material absorbs a portion of the light irradiated from the light source and emits a long-wavelength light. Further, the light emitted from the core-shell semiconductor nanoparticles or the luminescent material is combined with the remainder of the light irradiated from the light source, and the resulting mixed light can be utilized as light emitted from the light emitting device. A case of using the core-shell semiconductor nanoparticles will now be described as an example; however, the luminescent material may be used in place of the core-shell semiconductor nanoparticles, or the core-shell semiconductor nanoparticles and the luminescent material may be used in combination as well.

As the light source, specifically, one having an emission peak wavelength in a range of 380 nm to 485 nm, which is a short-wavelength region, is used. The emission peak wavelength of the light source is preferably 420 nm to 485 nm, more preferably 440 nm to 480 nm. This allows efficient excitation of the luminescent material, as well as effective utilization of visible light. In addition, by using a light source of such a wavelength range, a light emitting device having a high emission intensity can be provided.

The core-shell semiconductor nanoparticles may be used in combination with other semiconductor quantum dots, or any other phosphors that are not quantum dots (e.g., organic phosphors or inorganic phosphors). The other semiconductor quantum dots are, for example, the binary semiconductor quantum dots described above in the section of Background Art. As the phosphors that are not quantum dots, garnet-based phosphors such as aluminum-garnet phosphors can be used. Examples of the garnet-based phosphors include a cerium-activated yttrium-aluminum-garnet phosphor, and a cerium-activated lutetium-aluminum-garnet phosphor. Examples of phosphors that can be used also include: nitrogen-containing calcium aluminosilicate-based phosphors activated by europium and/or chromium; silicate-based phosphors activated by europium; β-SiAlON-based phosphors; nitride-based phosphors, such as CASN-based or SCASN-based phosphors; rare earth nitride-based phosphors, such as $LnSi_3N_{11}$-based or LnSiAlON-based phosphors; oxynitride-based phosphors, such as $BaSi_2O_2N_2$:Eu-based or $Ba_3Si_6O_{12}N_2$:Eu-based phosphors; sulfide-based phosphors, such as CaS-based, $SrGa_2S_4$-based, or ZnS-based phosphors; chlorosilicate-based phosphors; $SrLiAl_3N_4$:Eu phosphor; $SrMg_3SiN_4$:Eu phosphor; and $K_2SiF_6$:Mn phosphor as a manganese-activated fluoride complex phosphor.

In the light emitting device, the light conversion member containing the core-shell semiconductor nanoparticles may be, for example, a sheet member or a plate-like member, or may be a member having a three-dimensional shape. One example of the member having a three-dimensional shape is, in a surface-mount light-emitting diode in which a light source is arranged on the bottom surface of a recess formed in a package, a sealing member that is formed by filling the recess with a resin to seal a light emitting element.

Another example of the light conversion member is, in a case where a light source is arranged on a planar substrate, a resin member that is formed in such a manner to surround the upper surface and side surfaces of the light source with a substantially uniform thickness. Yet another example of the light conversion member is, in a case where the surrounding of a light source is filled with a reflective material-containing resin member such that the upper end of this resin member forms a single plane with the light source, a resin member that is formed in a plate-like shape with a prescribed thickness on top of the light source and the reflective material-containing resin member.

The light conversion member may be arranged in contact with the light source, or may be arranged away from the light source. Specifically, the light conversion member may be a pellet-like, sheet-like, plate-like, or rod-like member arranged away from the light source, or a member arranged in contact with the light source, such as a sealing member, a coating member (a member covering a light emitting element that is arranged separately from a molded member), or a molded member (e.g., a lens-shaped member).

In the light emitting device, when two or more kinds of core-shell semiconductor nanoparticles that emit different wavelengths of light are used, the two or more kinds of core-shell semiconductor nanoparticles may be mixed within a single light conversion member, or two or more light conversion members each containing only a single kind of quantum dots may be used in combination. In the latter case, the two or more light conversion members may form a laminated structure, or may be arranged in a dot-like or striped pattern on a plane.

As the light source, it is preferred to use a semiconductor light emitting element. One example of the semiconductor light emitting element is an LED chip. The LED chip may include a semiconductor layer composed of one or more selected from the group consisting of GaN, GaAs, InGaN, AlInGaP, GaP, SiC, and ZnO. A semiconductor light emitting element that emits blue-violet light, blue light, or ultraviolet rays includes a semiconductor layer composed of, for example, a GaN compound having a composition represented by $In_XAl_YGa_{1-X-Y}N$ ($0 \le X$, $0 \le Y$, $X+Y \le 1$).

The light emitting device of the present embodiment is preferably incorporated as a light source in a liquid-crystal display device. Since the band-edge emission by the core-shell semiconductor nanoparticles has a short emission lifetime, a light emitting device using the core-shell semiconductor nanoparticles is suitable as a light source of a liquid-crystal display device that requires a relatively high response speed. Further, the core-shell semiconductor nanoparticles of the present embodiment can exhibit band-edge emission having an emission peak with a small full width at half maximum. Therefore, the light emitting device may take the following mode:

(1) a mode in which blue light having a peak wavelength in a range of 420 nm to 490 nm is provided by a semiconductor blue light emitting element, while green light having a peak wavelength in a range of 510 nm to 550 nm, preferably 530 nm to 540 nm, and red light having a peak wavelength in a range of 600 nm to 680 nm, preferably 630 nm to 650 nm, are provided by the core-shell semiconductor nanoparticles; or (2) a mode in which ultraviolet light having a peak wavelength of 400 nm or shorter is provided by semiconductor light emitting element, while blue light having a peak wavelength in a range of 430 nm to 470 nm, preferably 440 nm to 460 nm, green light having a peak wavelength in a range of 510 nm to 550 nm, preferably 530 nm to 540 nm, and red light having a peak wavelength in a range of 600 nm to 680 nm, preferably 630 nm to 650 nm, are provided by the core-shell semiconductor nanoparticles.

By using the light emitting device in either of these modes, a liquid-crystal display device having good color reproducibility can be obtained without the use of a thick color filter. The light emitting device can be used as, for example, a direct backlight or an edge backlight.

Alternatively, a sheet, a plate-like member, or a rod, which contains the semiconductor nanoparticles having a core-shell structure and is made of a resin or glass, may be incorporated into a liquid-crystal display as a light conversion member independent of the light emitting device.

EXAMPLES

The present invention will now be described more concretely by way of Examples; however, the present invention is not limited to the below-described Examples.

Example 1

Synthesis of Semiconductor Nanoparticles

In a reaction vessel, 0.2 mmol of silver acetate (AgOAc), 0.1 mmol of indium acetate (In(OAc)$_3$), and 0.4 mmol of gallium diethyldithiocarbamate (Ga(DDTC)$_3$) were mixed with 10 mL of distilled and purified oleylamine (OLA) to obtain a first mixture. The thus obtained first mixture was heated to 80° C., vacuum-degassed, and then purged with an argon atmosphere. Subsequently, the first mixture was further heated to 150° C., and the liquid temperature was maintained at 150° C. for 30 minutes. The first mixture was then allowed to cool to room temperature, and coarse particles were removed by centrifugation, after which methanol was added to the resulting supernatant to induce precipitation of semiconductor nanoparticles serving as cores, which were subsequently recovered by centrifugation. The thus recovered solid was dispersed in 2 mL of oleylamine.

The shapes of the thus obtained semiconductor nanoparticles were observed under a transmission electron microscope (TEM, trade name: H-7650, manufactured by Hitachi High-Tech Science Corporation), and the average particle size was determined from TEM images captured at a magnification of ×80,000 to ×200,000. As a TEM grid, a High Resolution Carbon HRC-C10 STEM Cu100P grid (trade name, manufactured by Okenshoji, Co., Ltd.) was used. The obtained particles were thought to have a spherical shape or a polygonal shape. The average particle size was determined by selecting TEM images of at least three sites, measuring the particle size for all measurable particles contained in the TEM images, i.e., all particles except for those having their images cut off at the edge of a TEM image, and calculating the arithmetic mean of the thus measured values. In all of the below-described Examples and Comparative Examples, the particle size was measured for a total of at least 100 nanoparticles using three or more TEM images. The semiconductor nanoparticles to be used as cores had an average particle size of 4.4 nm with a standard deviation of 0.8 nm.

Subsequently, the substance amount of indium contained in the above-obtained semiconductor nanoparticles was determined by ICP emission spectroscopy (using ICPS-7510, manufactured by Shimadzu Corporation). The substance amount of the generated particles based on silver was calculated to be 82 μmol. When the average particle size is 4.4 nm, the volume of the semiconductor nanoparticles having a spherical shape is calculated to be 45 nm$^3$. The unit lattice volume of a tetragonal silver indium gallium sulfide crystal having an indium-to-gallium ratio (indium:gallium) of 1:1 is calculated to be 0.36 nm$^3$ (lattice constants: 0.578 nm, 0.578 nm, and 1.07 nm); therefore, by dividing the volume of the semiconductor nanoparticles by the unit lattice volume, it was calculated that a single semiconductor nanoparticle contained 124 unit lattices. Further, a single unit lattice of a tetragonal silver indium gallium sulfide crystal having an indium-to-gallium ratio (indium:gallium) of 1:1 contains 4 silver atoms; therefore, it was calculated that a single nanoparticle contained 496 silver atoms. By dividing the substance amount of indium by the number of indium atoms per nanoparticle, the substance amount of the semiconductor nanoparticles as nanoparticles was calculated to be 165 nmol.

Synthesis of Core-Shell Semiconductor Nanoparticles

Gallium acetylacetonate (Ga(acac)$_3$) and 1,3-dimethylthiourea were both measured in an amount of 0.1 mmol and added to 8 mL of distilled and purified oleylamine, and the above-synthesized oleylamine dispersion of semiconductor nanoparticles was further added as a dispersion of core particles in an amount equivalent to 30 nmol in terms of nanoparticle concentration to obtain a second mixture. The thus obtained second mixture was degassed at about 60° C. and purged with an argon atmosphere, and the temperature of this second mixture was subsequently rapidly raised to 230° C. (at a temperature-raising rate of about 60° C./min). After reaching 230° C., the temperature of the second mixture was further raised to 280° C. at a rate of 2° C./min, and the second mixture was heat-treated at 280° C. for 30 minutes. Thereafter, the second mixture was allowed to cool to room temperature, and methanol was added to induce precipitation of core-shell semiconductor nanoparticles, which were subsequently washed and then dispersed in chloroform.

Surface Modification Step

A portion of the thus obtained chloroform dispersion of core-shell semiconductor nanoparticles was fractionated, and an equal amount of tributyl phosphine (TBP) was added thereto and mixed, after which the resultant was left to stand at room temperature for 24 hours to obtain a dispersion of TBP-modified core-shell semiconductor nanoparticles.

Measurement of Absorption Spectrum, Emission Spectrum, and Quantum Yield

For the above-obtained semiconductor nanoparticles, core-shell semiconductor nanoparticles, and TBP-modified core-shell semiconductor nanoparticles, absorption spectrum and emission spectrum were measured. The results thereof are shown in Table 1. The measurement of absorption spectrum was performed using a UV-Vis-NIR spectrophotometer (trade name: V-670, manufactured by JASCO Corporation) in a wavelength range of 350 nm to 850 nm. The measurement of emission spectrum was performed using a spectrofluorometer (trade name: FP-8600, manufactured by JASCO Corporation) with an excitation light wavelength of 450 nm in an observation wavelength range of 460 nm to 1,010 nm for core particles, or with an excitation light wavelength of 365 nm in an observation wavelength range of 380 nm to 1,010 nm for core-shell particles. As for the quantum yield, measurement was performed using a fluorescence spectrometer PMA-12 (manufactured by Hamamatsu Photonics K.K.) equipped with an integrating sphere at room temperature (25° C.) with an excitation wavelength of 450 nm in a wavelength range of 350 nm to 1,100 nm, and the quantum yield was calculated for a wavelength range of 470 nm to 900 nm.

Figure 2:
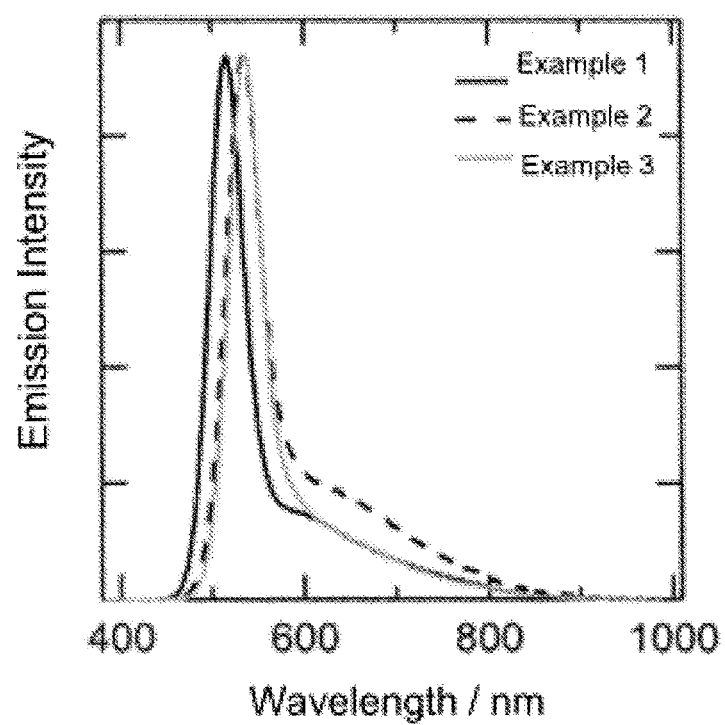
FIG. 2 shows emission spectra of the core-shell semiconductor nanoparticles of Examples 1 to 3.

As shown in FIG. 1, the absorption spectrum of the core-shell semiconductor nanoparticles was observed to have a slight shoulder at about 500 nm with substantially no absorption at around 580 nm and beyond; therefore, it is presumed that there is an exciton peak in a range of about 400 nm to 580 nm. Further, as shown in FIG. 2, in the emission spectrum of the core-shell semiconductor nanoparticles, band-edge emission having a full width at half maximum of 43 nm was observed at about 516 nm, and the quantum yield of this band-edge emission and the purity of the band-edge emission component were 38% and 59%, respectively. Moreover, in the emission spectrum of the TBP-modified core-shell semiconductor nanoparticles, band-edge emission having a full width at half maximum of about 43 nm was observed at about 516 nm, and the quantum yield of this band-edge emission and the purity of the band-edge emission component were 68% and 74%, respectively.

Example 2

Synthesis of Semiconductor Nanoparticles

Semiconductor nanoparticles, core-shell semiconductor nanoparticles, and TBP-modified core-shell semiconductor nanoparticles were obtained in the same manner as in Example 1, except that the first mixture was obtained by mixing, in a reaction vessel, 0.2 mmol of silver acetate (AgOAc), 0.1 mmol of indium acetate (In(OAc)$_3$), and 0.4 mmol of gallium diethyldithiocarbamate (Ga(DDTC)$_3$) were mixed with 6.5 mL of distilled and purified oleylamine (OLA) and 3.2 mL of oleic acid (OA). The measurement results obtained under the same conditions as in Example 1 are shown in Table 1. In addition, the relative absorbance spectrum of the thus obtained core-shell semiconductor nanoparticles, which was normalized by the maximum absorbance of the core-shell semiconductor nanoparticles of Example 1, is shown in FIG. 1, and the relative emission intensity spectrum of the core-shell semiconductor nanoparticles, which was normalized by the maximum emission intensity of the core-shell semiconductor nanoparticles of Example 1, is shown in FIG. 2.

Example 3

Semiconductor nanoparticles, core-shell semiconductor nanoparticles, and TBP-modified core-shell semiconductor nanoparticles were obtained in the same manner as in Example 2, except that, in the synthesis of the semiconductor nanoparticles, the amount of oleylamine (OLA) and that of oleic acid (OA) were changed to 3.3 mL and 6.3 mL, respectively. The measurement results obtained under the same conditions as in Example 1 are shown in Table 1. In addition, the relative absorbance spectrum of the thus obtained core-shell semiconductor nanoparticles, which was normalized by the maximum absorbance of the core-shell semiconductor nanoparticles of Example 1, is shown in FIG. 1, and the relative emission intensity spectrum of the core-shell semiconductor nanoparticles, which was normalized by the maximum emission intensity of the core-shell semiconductor nanoparticles of Example 1, is shown in FIG. 2.

Example 4

Figure 3:
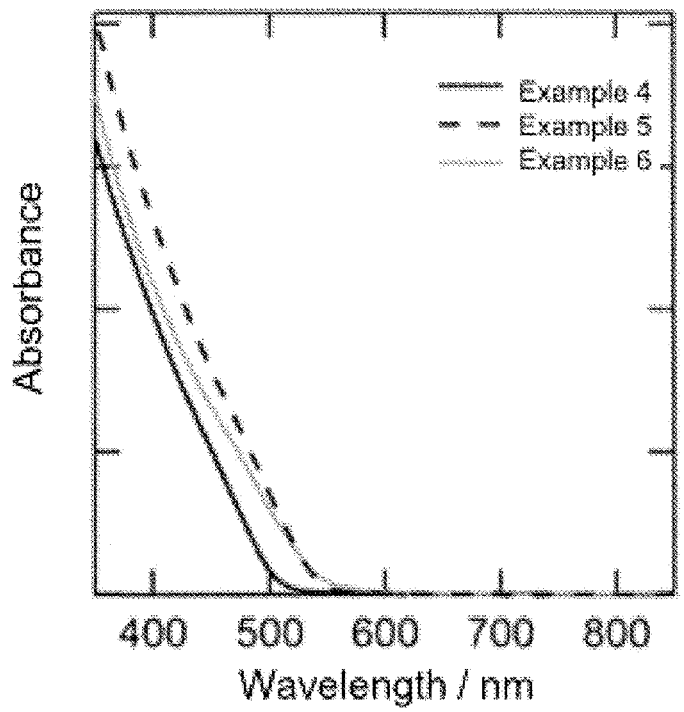
FIG. 3 shows absorption spectra of the core-shell semiconductor nanoparticles of Examples 4 to 6.
Figure 4:
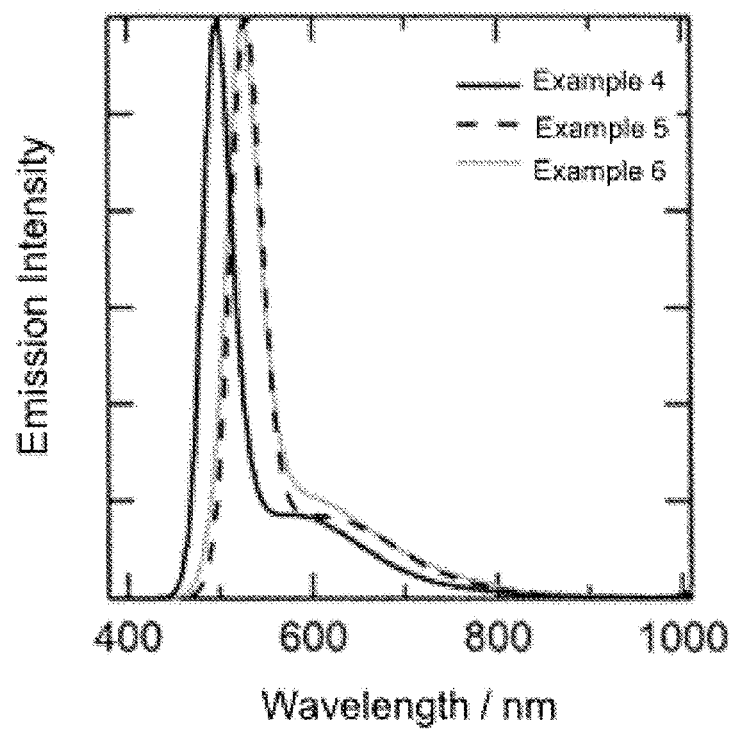
FIG. 4 shows emission spectra of the core-shell semiconductor nanoparticles of Examples 4 to 6.

Semiconductor nanoparticles, core-shell semiconductor nanoparticles, and TBP-modified core-shell semiconductor nanoparticles were obtained in the same manner as in Example 1, except that, in the synthesis of the semiconductor nanoparticles, the amount of indium acetate was changed to 0.067 mmol. The measurement results obtained under the same conditions as in Example 1 are shown in Table 1. In addition, the absorption spectrum of the core-shell semiconductor nanoparticles is shown in FIG. 3, and the emission spectrum of the core-shell semiconductor nanoparticles is shown in FIG. 4.

Example 5

Semiconductor nanoparticles, core-shell semiconductor nanoparticles, and TBP-modified core-shell semiconductor nanoparticles were obtained in the same manner as in Example 4, except that, in the synthesis of the semiconductor nanoparticles, the amount of oleylamine (OLA) and that of oleic acid (OA) were changed to 6.5 mL and 3.2 mL, respectively. The measurement results obtained under the same conditions as in Example 1 are shown in Table 1. In addition, the relative absorbance spectrum of the thus obtained core-shell semiconductor nanoparticles, which was normalized by the maximum absorbance of the core-shell semiconductor nanoparticles of Example 4, is shown in FIG. 3, and the relative emission intensity spectrum of the core-shell semiconductor nanoparticles, which was normalized by the maximum emission intensity of the core-shell semiconductor nanoparticles of Example 4, is shown in FIG. 4.

Example 6

Semiconductor nanoparticles, core-shell semiconductor nanoparticles, and TBP-modified core-shell semiconductor nanoparticles were obtained in the same manner as in Example 4, except that, in the synthesis of the semiconductor nanoparticles, the amount of oleylamine (OLA) and that of oleic acid (OA) were changed to 3.3 mL and 6.3 mL, respectively. The measurement results obtained under the same conditions as in Example 1 are shown in Table 1. In addition, the relative absorbance spectrum of the thus obtained core-shell semiconductor nanoparticles, which was normalized by the maximum absorbance of the core-shell semiconductor nanoparticles of Example 4, is shown in FIG. 3, and the relative emission intensity spectrum of the core-shell semiconductor nanoparticles, which was normalized by the maximum emission intensity of the core-shell semiconductor nanoparticles of Example 4, is shown in FIG. 4.

Example 7

Synthesis of Semiconductor Nanoparticles

In a reaction vessel, 0.2 mmol of silver acetate (AgOAc), 0.132 mmol of indium acetate (In(OAc)$_3$), and 0.266 mmol of gallium diethyldithiocarbamate (Ga(DDTC)$_3$) were mixed with 8 mL of dehydrated oleylamine (OLA) to obtain a first mixture. The thus obtained first mixture was vacuum-degassed and then purged with a nitrogen atmosphere. Subsequently, the temperature of the first mixture was raised to 150° C. at a rate of 10° C./min, and the temperature was maintained for 30 minutes after reaching 150° C. The first mixture was then allowed to cool to room temperature, and coarse particles were removed by centrifugation, after which 6 mL of methanol was added to the resulting supernatant to induce precipitation of particles having a large particle size and a low quantum yield, which were subsequently removed by centrifugation. Further, 3 mL of methanol was added to the supernatant to induce precipitation of semiconductor nanoparticles serving as cores, which were subsequently recovered by centrifugation. The thus recovered solid was washed with 4 mL of methanol and then dispersed in 5 mL of chloroform.

Synthesis of Core-Shell Semiconductor Nanoparticles

In a reaction vessel, 4 mL of the above-synthesized chloroform dispersion of semiconductor nanoparticles was measured as a dispersion of core particles, and vacuum-dried to remove chloroform. Next, 0.1 mmol of gallium acetylacetonate (Ga(acac)$_3$), 0.1 mmol of 1,3-dimethylthiourea, and 7 mL of dehydrated oleylamine were added to obtain a second mixture. The thus obtained second mixture was vacuum-degassed and purged with a nitrogen atmosphere, after which the temperature of this second mixture was rapidly raised to 260° C. (at a temperature-raising rate of about 50° C./min) and maintained for 2 hours after reaching 260° C. Subsequently, the second mixture was allowed to cool to about 100° C., and cooling was continued to about 60° C. while vacuum-degassing the reaction vessel to remove by-products such as a volatile sulfur compound. The resulting reaction solution was centrifuged to remove coarse particles, and 9 mL of methanol was added to induce precipitation of core-shell semiconductor particles, which were recovered by centrifugation and washed with 10 mL of methanol. Thereafter, the thus obtained core-shell semiconductor nanoparticles were dispersed in 3 mL of chloroform.

Surface Modification Step

A portion of the thus obtained chloroform dispersion of core-shell semiconductor nanoparticles was fractionated, and an equal amount of trioctyl phosphine (TOP) was added thereto, after which the resultant was stirred at room temperature for 22 hours to obtain a dispersion of TOP-modified core-shell semiconductor nanoparticles.

Measurement of Absorption Spectrum, Emission Spectrum, and Quantum Yield

Figure 5:
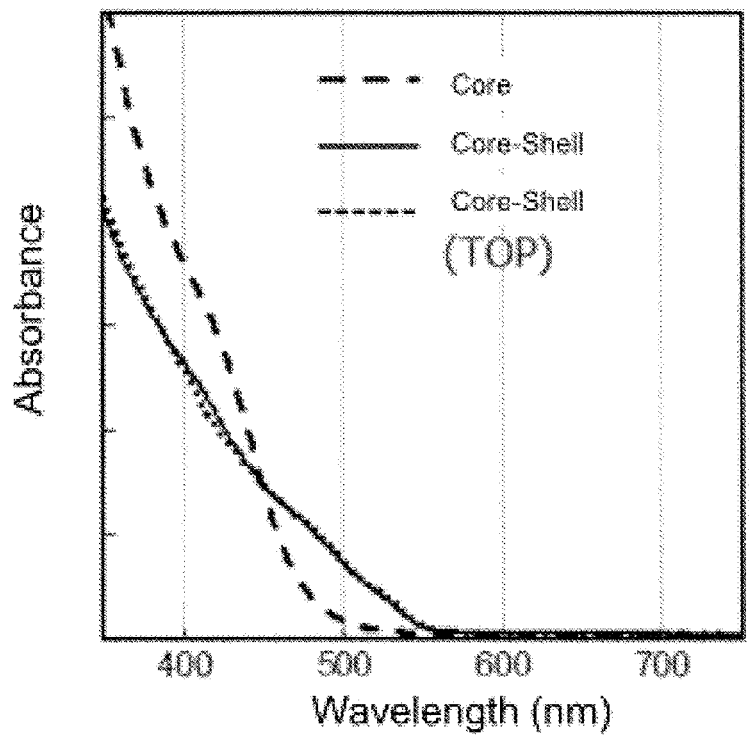
FIG. 5 shows absorption spectra of the core semiconductor nanoparticles, the core-shell semiconductor nanoparticles, and the TOP-modified core-shell semiconductor nanoparticles of Example 7.
Figure 6:
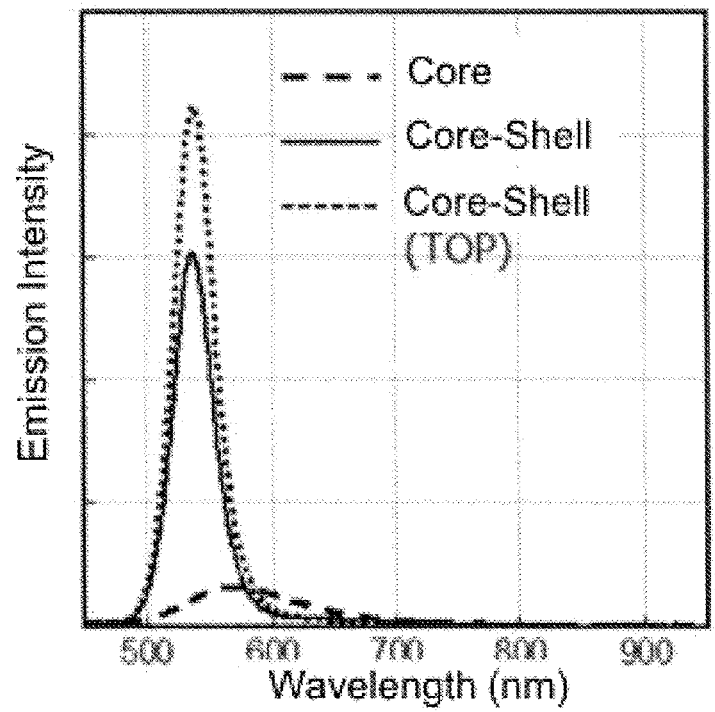
FIG. 6 shows emission spectra of the core semiconductor nanoparticles, the core-shell semiconductor nanoparticles, and the TOP-modified core-shell semiconductor nanoparticles of Example 7.

For the above-obtained core semiconductor nanoparticles, core-shell semiconductor nanoparticles, and TOP-modified core-shell semiconductor nanoparticles, absorption spectrum and emission spectrum were measured. The results thereof are shown in Table 1. In addition, the thus obtained absorption spectrum and emission spectrum are shown in FIGS. 5 and 6, respectively. The measurement of absorption spectrum was performed using a UV-Vis-NIR spectrophotometer (trade name: U-3310, manufactured by Hitachi High-Tech Science Corporation) in a wavelength range of 350 nm to 750 nm. The emission spectrum and the quantum yield were measured using a quantum efficiency measurement system (trade name: QE-2100, manufactured by Otsuka Electronics Co., Ltd.) at room temperature (25° C.) with an excitation light wavelength of 365 nm in a wavelength range of 300 nm to 950 nm, and the quantum efficiency was calculated for a wavelength range of 450 nm to 950 nm. Further, the particle concentration of each sample used for the measurement of absorption spectrum and emission spectrum was adjusted such that the sample had an absorbance of about 0.15 at 450 nm in the measurement of absorption spectrum.

As shown in FIG. 5, the absorption spectrum of the core-shell semiconductor nanoparticles and that of the TOP-modified core-shell semiconductor nanoparticles were observed to have a slight shoulder at about 430 nm with substantially no absorption at around 550 nm and beyond; therefore, it is presumed that there is an exciton peak in a range of about 400 nm to 550 nm. Further, as shown in FIG. 6, in the emission spectrum of the core-shell semiconductor nanoparticles, band-edge emission having a full width at half maximum of 37 nm was observed at about 539 nm, and the quantum yield of this band-edge emission and the purity of the band-edge emission component were 42% and 87%, respectively. Moreover, as shown in FIG. 6, in the emission spectrum of the TOP-modified core-shell semiconductor nanoparticles, band-edge emission having a full width at half maximum of about 37 nm was observed at about 540 nm, and the quantum yield of this band-edge emission and the purity of the band-edge emission component were 55 and 87%, respectively.

Example 8

Synthesis of Semiconductor Nanoparticles

In a reaction vessel, 1 mmol of silver acetate (AgOAc), 0.65 mmol of indium acetate (In(OAc)$_3$), and 1.3 mmol of gallium diethyldithiocarbamate (Ga(DDTC)$_3$) were mixed with 33 mL of dehydrated oleylamine (OLA) to obtain a first mixture. The thus obtained first mixture was vacuum-degassed and then purged with a nitrogen atmosphere. Subsequently, the temperature of the first mixture was raised to 140° C. at a rate of 10° C./min, and the temperature was maintained for 30 minutes after reaching 140° C. The first mixture was then allowed to cool to room temperature, and coarse particles were removed by centrifugation, after which 6 mL of methanol was added to the resulting supernatant to induce precipitation of particles having a large particle size and a low quantum yield, which were subsequently removed by centrifugation. Further, 3 mL of methanol was added to the supernatant to induce precipitation of semiconductor nanoparticles serving as cores, which were subsequently recovered by centrifugation. The thus recovered solid was washed with 4 mL of methanol and then dispersed in 5 mL of chloroform.

Synthesis of Core-Shell Semiconductor Nanoparticles

In a reaction vessel, 4 mL of the above-synthesized chloroform dispersion of semiconductor nanoparticles was measured as a dispersion of core particles, and vacuum-dried to remove chloroform. Next, 0.1 mmol of gallium acetylacetonate (Ga(acac)$_3$), 0.1 mmol of 1,3-dimethylthiourea, and 7 mL of dehydrated oleylamine were added to obtain a second mixture. The thus obtained second mixture was vacuum-degassed and purged with a nitrogen atmosphere, after which the temperature of this second mixture was rapidly raised to 260° C. (at a temperature-raising rate of about 50° C./min) and maintained for 2 hours after reaching 260° C. Subsequently, the second mixture was allowed to cool to about 100° C., and cooling was continued to about 60° C. while vacuum-degassing the reaction vessel to remove by-products such as a volatile sulfur compound. The resulting reaction solution was centrifuged to remove coarse particles, and 9 mL of methanol was added to induce precipitation of core-shell semiconductor particles, which were recovered by centrifugation and washed with 10 mL of methanol. Thereafter, the thus obtained core-shell semiconductor nanoparticles were dispersed in 3 mL of chloroform.

Measurement of Emission Spectrum and Quantum Yield

Figure 7:
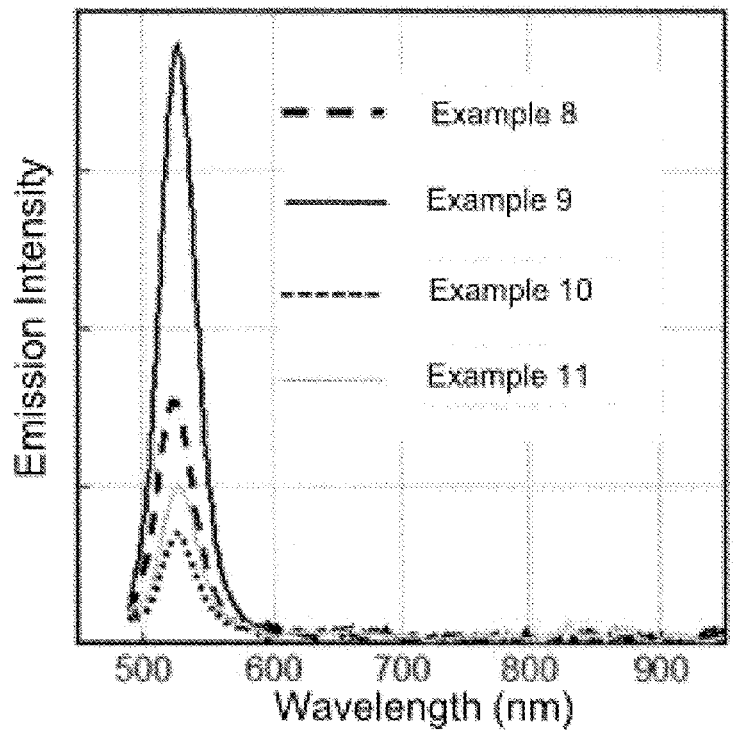
FIG. 7 shows emission spectra of the core-shell semiconductor nanoparticles of Examples 8 to 11.

Emission spectrum was measured for the thus obtained semiconductor nanoparticles and core-shell semiconductor nanoparticles. The results thereof are shown in Table 1. The emission spectrum and the quantum yield were measured using a quantum efficiency measurement system (trade name: QE-2100, manufactured by Otsuka Electronics Co., Ltd.) at room temperature (25° C.) with an excitation light wavelength of 450 nm in a wavelength range of 300 nm to 950 nm, and the quantum efficiency was calculated for a wavelength range of 500 nm to 950 nm. The measurement results are shown in Table 1 and FIG. 7. It is noted here that the particle concentration of each sample used for the measurement of emission spectrum was adjusted such that the sample had an absorbance of about 0.15 at 450 nm in the measurement of absorption spectrum.

Example 9

Semiconductor nanoparticles and core-shell semiconductor nanoparticles were obtained in the same manner as in Example 8, except that the heating temperature of the first mixture in the synthesis of the semiconductor nanoparticles was changed to 150° C. The measurement results obtained under the same conditions as in Example 8 are shown in Table 1 and FIG. 7. It is noted here that the particle concentration of each sample used for the measurement of emission spectrum was adjusted such that the sample had an absorbance of about 0.15 at 450 nm in the measurement of absorption spectrum.

Example 10

Semiconductor nanoparticles and core-shell semiconductor nanoparticles were obtained in the same manner as in Example 8, except that the heating temperature of the first mixture in the synthesis of the semiconductor nanoparticles was changed to 180° C. The measurement results obtained under the same conditions as in Example 8 are shown in Table 1 and FIG. 7. It is noted here that the particle concentration of each sample used for the measurement of emission spectrum was adjusted such that the sample had an absorbance of about 0.15 at 450 nm in the measurement of absorption spectrum.

Example 11

Semiconductor nanoparticles and core-shell semiconductor nanoparticles were obtained in the same manner as in Example 8, except that the heating temperature of the first mixture in the synthesis of the semiconductor nanoparticles was changed to 200° C. The measurement results obtained under the same conditions as in Example 8 are shown in Table 1 and FIG. 7. It is noted here that the particle concentration of each sample used for the measurement of emission spectrum was adjusted such that the sample had an absorbance of about 0.15 at 450 nm in the measurement of absorption spectrum.

Comparative Example 1

Synthesis of Semiconductor Nanoparticles

In a reaction vessel, 0.4 mmol of silver acetate (AgOAc), 0.16 mmol of indium acetylacetonate (In(acac)$_3$), 0.24 mmol of gallium acetylacetonate (Ga(acac)$_3$), 8 mL of dehydrated oleylamine (OLA), and dodecanethiol (1.25 mmol, 0.3 mL) were measured, and the reaction vessel was degassed and then purged with a nitrogen atmosphere, after which the temperature was raised to about 50° C., and the lid was opened once to add crystals of thiourea (0.8 mmol, 60.8 mg) to obtain a first mixture. Subsequently, the thus obtained first mixture was degassed for a very short time, and the temperature was raised to 150° C. at a temperature-raising rate of 10° C./min. After the temperature reached 150° C. in an actual measurement, a heat treatment was continued for 60 seconds. The reaction vessel was then rapidly cooled by immersion in 50° C. water to quench the synthesis reaction. In the early stage of this rapid cooling, the temperature was lowered at an average rate of about 40° C./min. After removing coarse particles by centrifugation, 9 mL of methanol was added to the resulting supernatant to induce precipitation of semiconductor nanoparticles serving as cores, which were subsequently recovered by centrifugation. The thus recovered solid was dispersed in 5 mL of hexane.

Synthesis of Core-Shell Semiconductor Nanoparticles

In a reaction vessel, 3.3 mL of the above-synthesized hexane dispersion of semiconductor nanoparticles was measured as a dispersion of core particles, and 0.2 mmol of gallium acetylacetonate (Ga(acac)$_3$), 0.3 mmol of 1,3-dimethylthiourea, and 36.5 mmol of tetradecylamine were added thereto to obtain a second mixture. The thus obtained second mixture was vacuum-degassed, and the temperature thereof was raised to 50° C. to dissolve tetradecylamine while removing hexane by vaporization. Subsequently, the second mixture was purged with a nitrogen atmosphere, and the temperature was raised to 270° C. (at a temperature-raising rate of 10° C./min) and maintained for 1 hour after reaching 270° C. The second mixture was then allowed to cool to about 100° C., and cooling was continued to about 60° C. while vacuum-degassing the reaction vessel to remove by-products such as a volatile sulfur compound. To the resulting reaction solution, 3 mL of hexane was added, and this was followed by centrifugation to remove coarse particles. Then, 8 mL of methanol was added, and the resultant was centrifuged to precipitate and remove particles having a large particle size and a low quantum yield, after which 12 mL of methanol was further added to the resulting supernatant to induce precipitation of core-shell semiconductor particles, which were subsequently recovered by centrifugation and washed with 10 mL of methanol. Thereafter, the thus obtained core-shell semiconductor nanoparticles were dispersed in 3 mL of hexane.

Surface Modification Step

A portion of the thus obtained chloroform dispersion of core-shell semiconductor nanoparticles was fractionated, and an equal amount of trioctyl phosphine (TOP) was added thereto, after which the resultant was stirred at room temperature for 22 hours to obtain a dispersion of TOP-modified core-shell semiconductor nanoparticles.

Measurement of Absorption Spectrum, Emission Spectrum, and Quantum Yield

Figure 8:
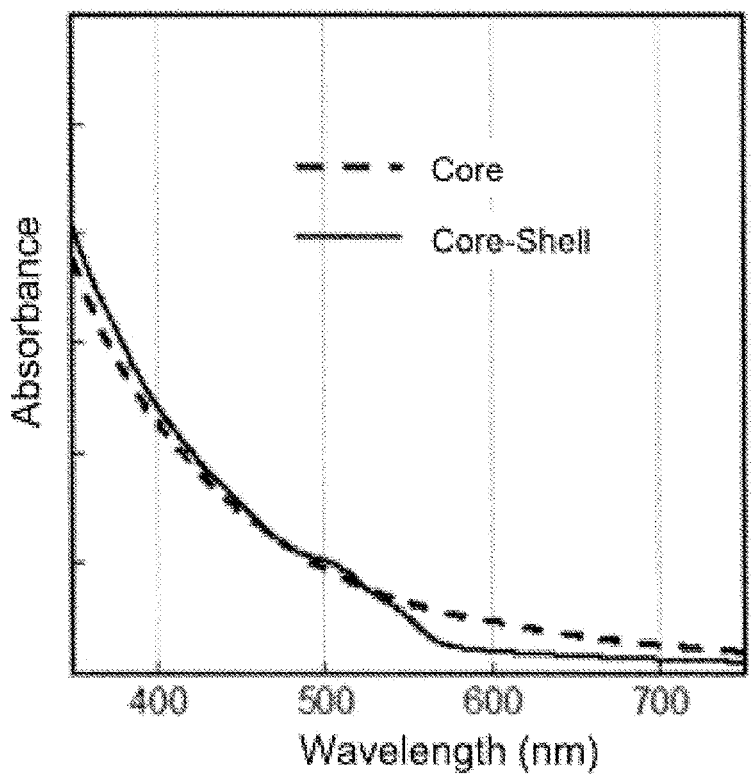
FIG. 8 shows absorption spectra of the core semiconductor nanoparticles and the core-shell semiconductor nanoparticles of Comparative Example 1.
Figure 9:
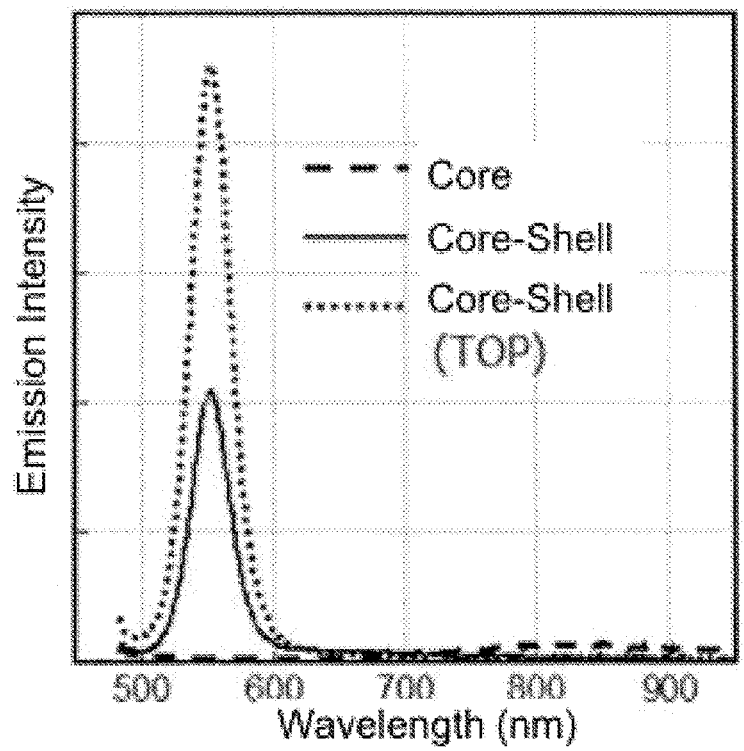
FIG. 9 shows emission spectra of the core semiconductor nanoparticles, the core-shell semiconductor nanoparticles, and the TOP-modified core-shell semiconductor nanoparticles of Comparative Example 1.

For the above-obtained semiconductor nanoparticles, core-shell semiconductor nanoparticles, and TOP-modified core-shell semiconductor nanoparticles, absorption spectrum and emission spectrum were measured. The results thereof are shown in Table 2. In addition, the thus obtained absorption spectrum and emission spectrum are shown in FIGS. 8 and 9, respectively. The measurement of absorption spectrum was performed using a UV-Vis-NIR spectrophotometer (trade name: U-2900, manufactured by Hitachi High-Tech Science Corporation) in a wavelength range of 350 nm to 750 nm. The emission spectrum and the quantum yield were measured using a quantum efficiency measurement system (trade name: QE-2100, manufactured by Otsuka Electronics Co., Ltd.) at room temperature (25° C.) with an excitation light wavelength of 450 nm in a wavelength range of 300 nm to 950 nm, and the quantum efficiency was calculated for a wavelength range of 500 nm to 950 nm. Further, the particle concentration of each sample used for the measurement of absorption spectrum and emission spectrum was adjusted such that the sample had an absorbance of about 0.15 at 450 nm in the measurement of absorption spectrum.

Comparative Example 2

Figure 10:
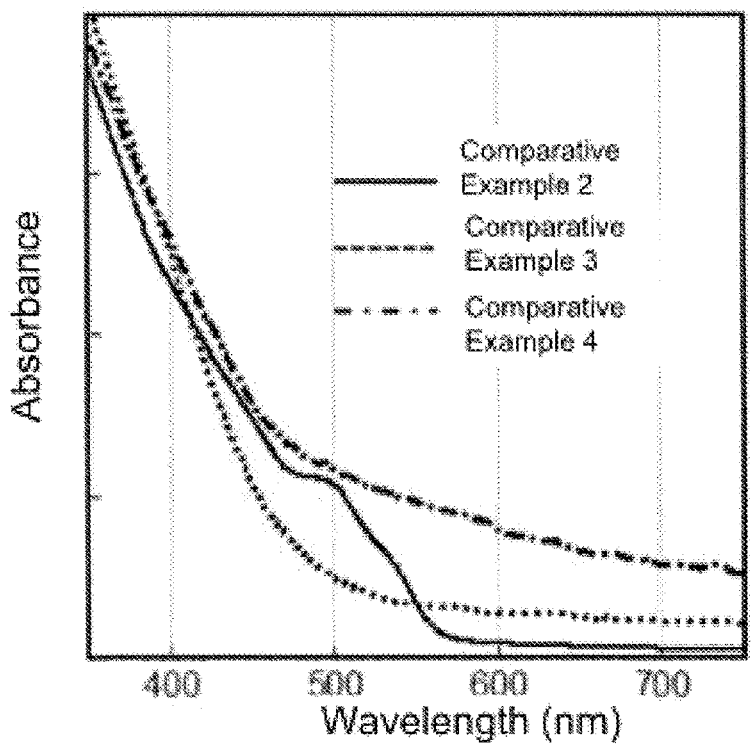
FIG. 10 shows absorption spectra of the core-shell semiconductor nanoparticles of Comparative Examples 2 to 4.
Figure 11:
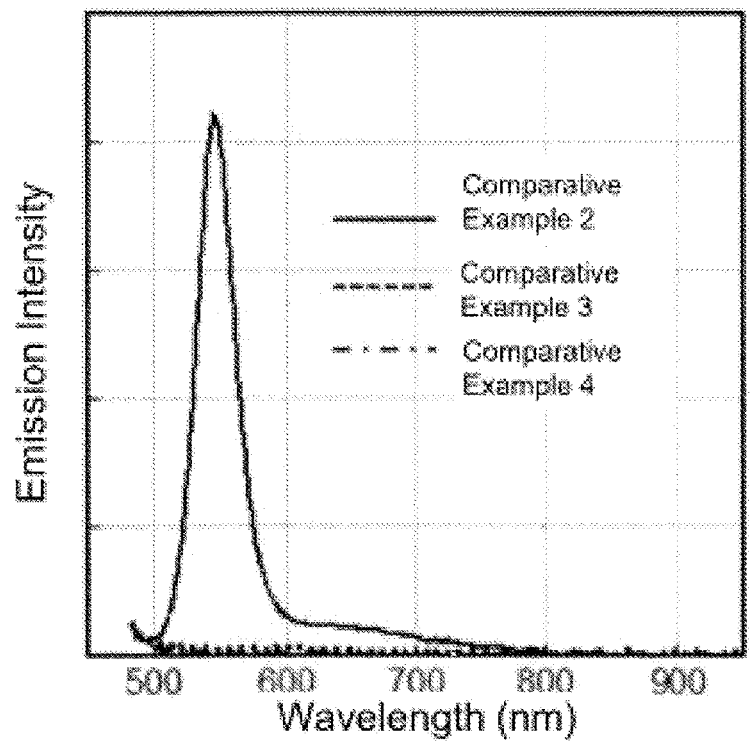
FIG. 11 shows emission spectra of the core-shell semiconductor nanoparticles of Comparative Examples 2 to 4.

Core-shell semiconductor nanoparticles were obtained in the same manner as in Comparative Example 1, except that the amount of indium acetate (In(OAc)$_3$) and that of gallium acetylacetonate (Ga(acac)$_3$) were changed to 0.12 mmol and 0.28 mmol, respectively. The measurement results obtained under the same conditions as in Comparative Example 1 are shown in Table 2. In addition, the thus obtained absorption spectrum and emission spectrum are shown in FIGS. 10 and 11, respectively. It is noted here that the particle concentration of each sample used for the measurement of absorption spectrum and emission spectrum was adjusted such that the sample had an absorbance of about 0.15 at 450 nm in the measurement of absorption spectrum.

Comparative Example 3

Synthesis of Semiconductor Nanoparticles

Core-shell semiconductor nanoparticles were obtained in the same manner as in Comparative Example 1, except that the amount of indium acetate (In(OAC)$_3$) and that of gallium acetylacetonate (Ga(acac)$_3$) were changed to 0.1 mmol and 0.3 mmol, respectively. For the thus obtained core-shell semiconductor nanoparticles, absorption spectrum and emission spectrum were directly measured. The measurement results are shown in Table 2. In addition, the thus obtained absorption spectrum and emission spectrum are shown in FIGS. 10 and 11, respectively. The measurement of absorption spectrum was performed using a UV-Vis-NIR spectrophotometer (trade name: U-2900, manufactured by Hitachi High-Tech Science Corporation) in a wavelength range of 350 nm to 750 nm. The emission spectrum and the quantum yield were measured using a quantum efficiency measurement system (trade name: QE-2100, manufactured by Otsuka Electronics Co., Ltd.) at room temperature (25° C.) with an excitation light wavelength of 450 nm in a wavelength range of 300 nm to 950 nm, and the quantum efficiency was calculated for a wavelength range of 500 nm to 950 nm.

Comparative Example 4

Synthesis of Semiconductor Nanoparticles

Core-shell semiconductor nanoparticles were obtained in the same manner as in Comparative Example 1, except that the amount of indium acetate (In(OAc)$_3$) and that of gallium acetylacetonate (Ga(acac)$_3$) were changed to 0.08 mmol and 0.32 mmol, respectively. The measurement results obtained under the same conditions as in Comparative Example 1 are shown in Table 2. In addition, the thus obtained absorption spectrum and emission spectrum are shown in FIGS. 10 and 11, respectively. It is noted here that the particle concentration of each sample used for the measurement of absorption spectrum and emission spectrum was adjusted such that the sample had an absorbance of about 0.15 at 450 nm in the measurement of absorption spectrum.

TABLE 1

| | Core syntesis condition | | | | | | Semiconducttor Nanoparticles (Core) | |
|---|---|---|---|---|---|---|---|---|
| | | | | | | | Average | |
| | Ag(OAc) (mmol) | In(OAc)$_3$ (mmol) | Ga(DDTC)$_3$ (mmol) | OLA (ml) | OA (ml) | Heat-treating temperature (° C.) | particle size (nm) | Sandard deviation (nm) |
| Example 1 | 0.2 | 0.1 | 0.4 | 10 | — | 150 | 4.4 | 0.8 |
| Example 2 | 0.2 | 0.1 | 0.4 | 6.5 | 3.2 | 150 | 4.3 | 0.8 |
| Example 3 | 0.2 | 0.1 | 0.4 | 3.3 | 6.3 | 150 | 6.3 | 2.2 |
| Example 4 | 0.2 | 0.067 | 0.4 | 10 | — | 150 | 6.1 | 1.1 |
| Example 5 | 0.2 | 0.067 | 0.4 | 6.5 | 3.2 | 150 | — | — |
| Example 6 | 0.2 | 0.067 | 0.4 | 3.3 | 6.3 | 150 | — | — |
| Example 7 | 0.2 | 0.132 | 0.266 | 8 | — | 150 | — | — |
| Example 8 | 1 | 0.65 | 1.3 | 33 | — | 140 | — | — |
| Example 9 | 1 | 0.65 | 1.3 | 33 | — | 150 | — | — |
| Example 10 | 1 | 0.65 | 1.3 | 33 | — | 180 | — | — |
| Example 11 | 1 | 0.65 | 1.3 | 33 | — | 200 | — | — |

| | Semiconducttor Nanoparticles (Core) | Core-Shell Semiconductor Nanoparticles | | | | After surface modification step | |
|---|---|---|---|---|---|---|---|
| | Quantum yield (%) | Peak emission wavelength (nm) | Full width at half maximum (nm) | Quantum yield (%) | Purity (%) | Quantum yield (%) | Purity (%) |
| Example 1 | 8 | 516 | 43 | 38 | 59 | 68 | 74 |
| Example 2 | 34 | 534 | 40 | 56 | 61 | 87 | 64 |
| Example 3 | 25 | 532 | 42 | 55 | 48 | 80 | 61 |
| Example 4 | 4 | 495 | 34 | 21 | 59 | 24 | 76 |
| Example 5 | 25 | 528 | 38 | 36 | 57 | 54 | 77 |

TABLE 1-continued

| | | | | | | | |
|---|---|---|---|---|---|---|---|
| Example 6 | 18 | 525 | 41 | 36 | 57 | 63 | 67 |
| Example 7 | 11 | 539 | 37 | 42 | 87 | 55 | 87 |
| Example 8 | 18 | 525 | 36 | 11 | 71 | — | — |
| Example 9 | 18 | 528 | 33 | 26 | 86 | — | — |
| Example 10 | 20 | 528 | 35 | 5 | 60 | — | — |
| Example 11 | 13 | 530 | 36 | 9 | 74 | — | — |

TABLE 2

| | Core syntesis condition | | | | | | Semiconducttor Nanoparicles (Core) | |
|---|---|---|---|---|---|---|---|---|
| | Ag(OAc) (mmol) | In(acac)3 (mmol) | Ga(acac)$_3$ (mmol) | OLA (ml) | DDT (ml) | Heat-treating temperature (° C.) | Average particle size (nm) | Sandard deviation (nm) |
| Comparative Example 1 | 0.4 | 0.16 | 0.24 | 8 | 0.3 | 150 | 5.2 | 1.2 |
| Comparative Example 2 | 0.4 | 0.12 | 0.28 | 8 | 0.3 | 150 | 5.8 | 2.1 |
| Comparative Example 3 | 0.4 | 0.1 | 0.3 | 8 | 0.3 | 150 | 6.0 | 1.6 |
| Comparative Example 4 | 0.4 | 0.08 | 0.32 | 8 | 0.3 | 150 | — | — |

| | Semiconducttor Nanoparicles (Core) | Core-Shell Semiconductor Nanoparticles | | | | After surface modification step | |
|---|---|---|---|---|---|---|---|
| | Quantum yield (%) | Peak emission wavelength (nm) | Full width at half maximum (nm) | Quantum yield (%) | Purity (%) | Quantum yield (%) | Purity (%) |
| Comparative Example 1 | 10 | 554 | 34 | 20 | 73 | 48 | 83 |
| Comparative Example 2 | 5 | 548 | 34 | 25 | 71 | — | — |
| Comparative Example 3 | 0 | — | — | 0 | — | — | — |
| Comparative Example 4 | 0 | — | — | 0 | — | — | — |

From Table 1, it was confirmed that, in Examples 1 to 11 where semiconductor nanoparticles were produced using a compound containing Ga and S, the core-shell semiconductor nanoparticles obtained from these semiconductor nanoparticles exhibited band-edge emission with an emission peak wavelength of 540 nm or shorter.

From a comparison of Example 1 with Example 4, it was confirmed that the emission peak wavelength of the core-shell semiconductor nanoparticles was shortened by increasing the ratio of the number of Ga atoms with respect to a total number of In and Ga atoms contained in the first mixture.

From a comparison of Example 1 with Example 2, it was confirmed that the emission peak wavelength of the core-shell semiconductor nanoparticles was shifted when the organic solvent in the first mixture contained an unsaturated fatty acid.

From Table 1, it was confirmed that in Examples 8 to 11 where the heat treatment temperature of the first mixture was changed, the core-shell semiconductor nanoparticles had a high quantum yield when the actual heat treatment temperature was 150° C.

According to Table 2, in Comparative Examples 1 and 2 where semiconductor nanoparticles were produced using a Ga-containing compound and an S-containing compound, the core-shell semiconductor nanoparticles obtained from these semiconductor nanoparticles exhibited band-edge emission, but had an emission peak wavelength of longer than 540 nm. In addition, the semiconductor nanoparticles obtained in Comparative Examples 3 and 4, where the ratio of the number of Ga atoms with respect to a total number of In and Ga atoms contained in the first mixture was increased as compared to Comparative Example 2, did not emit any light.

Example 12

Synthesis of Semiconductor Nanoparticles

In a reaction vessel, 0.5 mmol of silver acetate (AgOAc), 0.33 mmol of indium acetate (In(OAc)$_3$), and 0.65 mmol of gallium ethyl xanthate (Ga(EX)$_3$) were mixed with 16 mL of dehydrated oleylamine (OLA) to obtain a first mixture. The thus obtained first mixture was vacuum-degassed and then purged with a nitrogen atmosphere. Subsequently, the temperature of the first mixture was raised to 150° C. at a rate of 10° C./min, and the temperature was maintained for 30 minutes after reaching 150° C. The first mixture was then allowed to cool to room temperature, and coarse particles were removed by centrifugation, after which 6 mL of methanol was added to the resulting supernatant to induce precipitation of particles having a large particle size and a low quantum yield, which were subsequently removed by centrifugation. Further, 3 mL of methanol was added to the supernatant to induce precipitation of semiconductor nanoparticles serving as cores, which were subsequently recovered by centrifugation. The thus recovered solid was washed with 4 mL of methanol and then dispersed in 5 mL of chloroform.

Synthesis of Core-Shell Semiconductor Nanoparticles

In a reaction vessel, as a dispersion of core particles, the above-synthesized chloroform dispersion of semiconductor nanoparticles was measured in an amount equivalent to 23 nmol in terms of nanoparticle concentration, and vacuum-dried to remove chloroform. Next, 0.15 mmol of gallium acetylacetonate (Ga(acac)$_3$), 0.15 mmol of 1,3-dimethylthiourea, and 11 mL of dehydrated oleylamine were added to obtain a second mixture. The thus obtained second mixture was vacuum-degassed and purged with a nitrogen atmosphere, after which the temperature of this second mixture was rapidly raised to 260° C. (at a temperature-raising rate of about 50° C./min) and maintained for 2 hours after reaching 260° C. Subsequently, the second mixture was allowed to cool to about 100° C., and cooling was continued to about 60° C. while vacuum-degassing the reaction vessel to remove by-products such as a volatile sulfur compound. The resulting reaction solution was centrifuged to remove coarse particles, and 9 mL of methanol was added to induce precipitation of core-shell semiconductor particles, which were recovered by centrifugation and washed with 10 mL of methanol. Thereafter, the thus obtained core-shell semiconductor nanoparticles were dispersed in 3 mL of chloroform.

Measurement of Emission Spectrum and Quantum Yield

Figure 13:
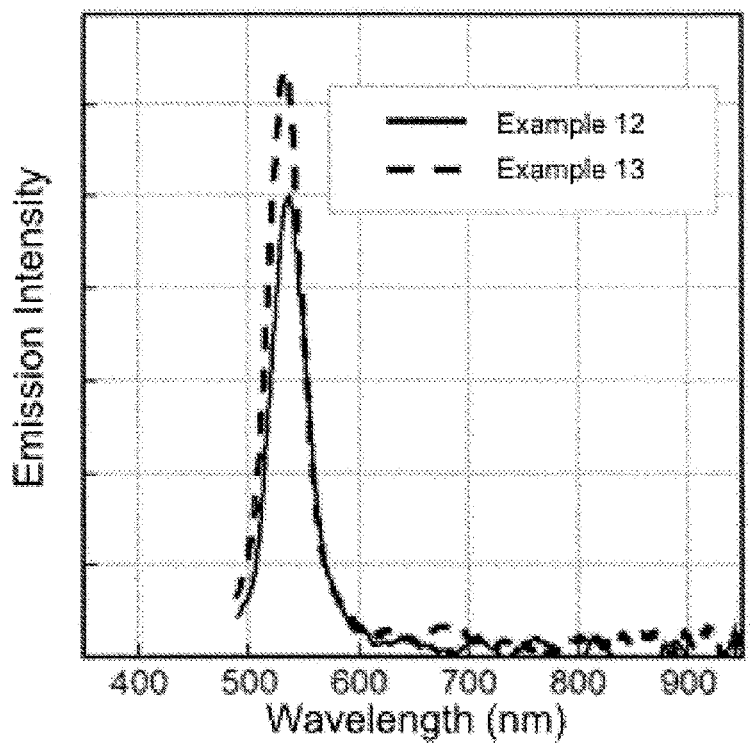
FIG. 13 shows emission spectra of the core-shell semiconductor nanoparticles of Examples 12 and 13.

Emission spectrum of the thus obtained core-shell semiconductor nanoparticles was measured. The results thereof are shown in Table 3. The emission spectrum and the quantum yield were measured using a quantum efficiency measurement system (trade name: QE-2100, manufactured by Otsuka Electronics Co., Ltd.) at room temperature (25° C.) with an excitation light wavelength of 365 nm in a wavelength range of 300 nm to 950 nm, and the quantum efficiency was calculated for a wavelength range of 450 nm to 950 nm. FIG. 13 shows the emission spectrum of the core-shell semiconductor nanoparticles.

As shown in FIG. 13, in the emission spectrum of the core-shell semiconductor nanoparticles, band-edge emission having a full width at half maximum of 39 nm was observed at about 538 nm, and the quantum yield of this band-edge emission and the purity of the band-edge emission component were 25% and 85%, respectively.

Example 13

Synthesis of Semiconductor Nanoparticles

In a reaction vessel, 0.5 mmol of silver ethyl xanthate (Ag(EX)), 0.5 mmol of indium acetate (In(OAc)$_3$), and 0.85 mmol of gallium ethyl xanthate (Ga(EX)$_3$) were mixed with 16 mL of dehydrated oleylamine (OLA) to obtain a first mixture. The thus obtained first mixture was vacuum-degassed and then purged with a nitrogen atmosphere. Subsequently, the temperature of the first mixture was raised to 150° C. at a rate of 10° C./min, and the temperature was maintained for 30 minutes after reaching 150° C. The first mixture was then allowed to cool to room temperature, and coarse particles were removed by centrifugation, after which 6 mL of methanol was added to the resulting supernatant to induce precipitation of particles having a large particle size and a low quantum yield, which were subsequently removed by centrifugation. Further, 3 mL of methanol was added to the supernatant to induce precipitation of semiconductor nanoparticles serving as cores, which were subsequently recovered by centrifugation. The thus recovered solid was washed with 4 mL of methanol and then dispersed in 5 mL of chloroform.

Synthesis of Core-Shell Semiconductor Nanoparticles

In a reaction vessel, as a dispersion of core particles, the above-synthesized chloroform dispersion of semiconductor nanoparticles was measured in an amount equivalent to 23 nmol in terms of nanoparticle concentration, and vacuum-dried to remove chloroform. Next, 0.15 mmol of gallium acetylacetonate (Ga(acac)$_3$), 0.15 mmol of 1,3-dimethylthiourea, and 11 mL of dehydrated oleylamine were added to obtain a second mixture. The thus obtained second mixture was vacuum-degassed and purged with a nitrogen atmosphere, after which the temperature of this second mixture was rapidly raised to 260° C. (at a temperature-raising rate of about 50° C./min) and maintained for 2 hours after reaching 260° C. Subsequently, the second mixture was allowed to cool to about 100° C., and cooling was continued to about 60° C. while vacuum-degassing the reaction vessel to remove by-products such as a volatile sulfur compound. The resulting reaction solution was centrifuged to remove coarse particles, and 9 mL of methanol was added to induce precipitation of core-shell semiconductor particles, which were recovered by centrifugation and washed with 10 mL of methanol. Thereafter, the thus obtained core-shell semiconductor nanoparticles were dispersed in 3 mL of chloroform.

Measurement of Emission Spectrum and Quantum Yield

Emission spectrum of the thus obtained core-shell semiconductor nanoparticles was measured. The results thereof are shown in Table 3. The emission spectrum and the quantum yield were measured using a quantum efficiency measurement system (trade name: QE-2100, manufactured by Otsuka Electronics Co., Ltd.) at room temperature (25° C.) with an excitation light wavelength of 365 nm in a wavelength range of 300 nm to 950 nm, and the quantum efficiency was calculated for a wavelength range of 450 nm to 950 nm. FIG. 13 shows the relative emission intensity spectrum of the core-shell semiconductor nanoparticles, which was normalized by the maximum emission intensity of the core-shell semiconductor nanoparticles of Example 12.

As shown in FIG. 13, in the emission spectrum of the core-shell semiconductor nanoparticles, band-edge emission having a full width at half maximum of 38 nm was observed at about 533 nm, and the quantum yield of this band-edge emission and the purity of the band-edge emission component were 34% and 88%, respectively.

TABLE 3

| | Core syntesis condition | | | | | Core-Shell Semiconductor Nanoparticles | | | |
|---|---|---|---|---|---|---|---|---|---|
| | Ag(OAc) (mmol) | Ag(EX) (mmol) | In(acac)$_3$ (mmol) | Ga(EX)$_3$ (mmol) | OLA (ml) | Heat-treating temperature (° C.) | Peak emission wavelength (nm) | Full width at half maximum (nm) | Bnad-edge emission purity (%) | Quatntum yield (%) |
| Example 12 | 0.5 | — | 0.33 | 0.65 | 16 | 150 | 538 | 39 | 85 | 25 |
| Example 13 | — | 0.5 | 0.50 | 0.85 | 16 | 150 | 533 | 38 | 88 | 34 |

From Table 3, it was confirmed that, in Examples 12 to 0.13 where semiconductor nanoparticles were produced using a compound containing Ga and S, the core-shell semiconductor nanoparticles obtained from these semiconductor nanoparticles exhibited band-edge emission with an emission peak wavelength of 540 nm or shorter. It was also confirmed that, in Example 14 where semiconductor nanoparticles were produced using a compound containing Ag and S, the core-shell semiconductor nanoparticles obtained from these semiconductor nanoparticles had a high quantum yield.

Example 14

Third Step

A third mixture was obtained by mixing 0.1 mmol of silver ethyl xanthate (Ag(EX)), 0.12 mmol of indium acetate (In(OAc)$_3$), 0.2 mmol of gallium ethyl xanthate (Ga(EX)$_3$), and 0.020 mmol of gallium chloride with 20 mL of oleylamine (OLA). This third mixture was heat-treated at 260° C. for 120 minutes with stirring in a nitrogen atmosphere. The thus obtained suspension was allowed to cool and then centrifuged (radius: 146 mm, at 3,800 rpm for 5 minutes), and the resulting precipitate was removed to obtain a dispersion of third semiconductor nanoparticles.

Measurement of Emission Spectrum

Emission spectrum of the third semiconductor nanoparticles obtained above was measured, and the band-edge emission peak wavelength, the full width at half maximum, the band-edge emission purity, and the internal quantum yield of band-edge emission were determined. It is noted here that the emission spectrum was measured using a quantum efficiency measurement system (trade name: QE-2100, manufactured by Otsuka Electronics Co., Ltd.) at room temperature (25° C.) with an excitation light wavelength of 365 nm in a wavelength range of 300 nm to 950 nm, and the internal quantum yield was calculated for a wavelength range of 450 nm to 950 nm. The results thereof are shown in Table 4 and FIG. 14.

Comparative Example 5

Synthesis of Semiconductor Nanoparticles

In a reaction vessel, 0.4 mmol of silver acetate (AgOAc), 0.16 mmol of indium acetylacetonate (In(acac)$_3$), 0.24 mmol of gallium acetylacetonate (Ga(acac)$_3$), 8 mL of dehydrated oleylamine (OLA), and dodecanethiol (DDT; 1.25 mmol, 0.3 mL) were measured, and the reaction vessel was degassed and then purged with a nitrogen atmosphere, after which the temperature was raised to about 50° C., and the lid was opened once to add crystals of thiourea (0.8 mmol, 60.8 mg) to obtain a mixture. Subsequently, the thus obtained mixture was degassed for a very short time, and the temperature was raised to 150° C. at a temperature-raising rate of 10° C./min. After the temperature reached 150° C. in an actual measurement, a heat treatment was continued for 60 seconds. The reaction vessel was then rapidly cooled by immersion in 50° C. water to quench the synthesis reaction. In the early stage of this rapid cooling, the temperature was lowered at an average rate of about 40° C./min. After removing coarse particles by centrifugation, 9 mL of methanol was added to the resulting supernatant to induce precipitation of semiconductor nanoparticles, which were subsequently recovered by centrifugation. The thus recovered solid was dispersed in 5 mL of hexane.

Figure 14:
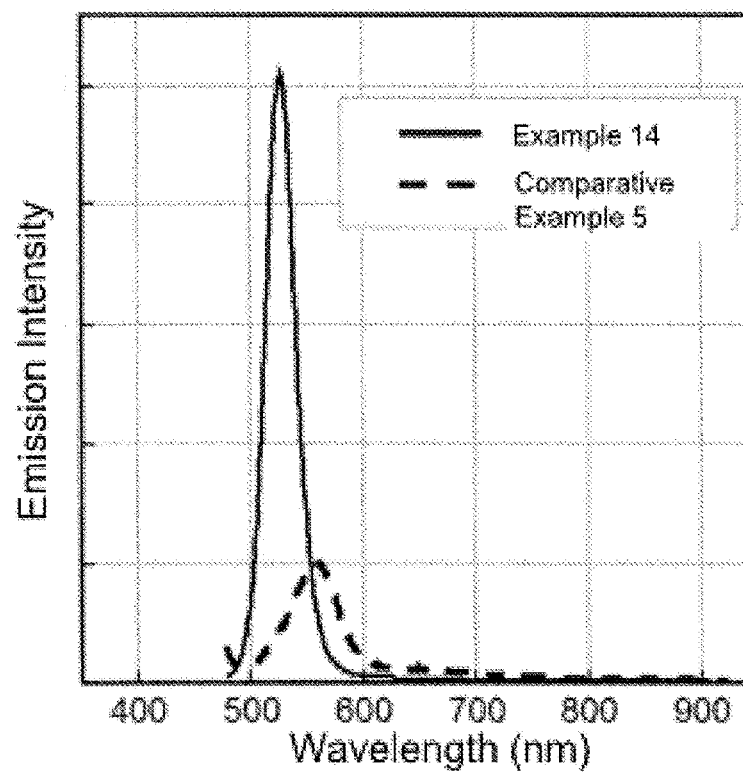
FIG. 14 shows exemplary emission spectra of the semiconductor nanoparticles of Example 14 and Comparative Example 5.

In a reaction vessel, 3.3 mL of the above-synthesized hexane dispersion of semiconductor nanoparticles was measured as a dispersion of semiconductor particles, and 0.2 mmol of gallium acetylacetonate (Ga(acac)$_3$), 0.3 mmol of 1,3-dimethylthiourea, and 36.5 mmol of tetradecylamine were added thereto to obtain a mixture. The thus obtained mixture was vacuum-degassed, and the temperature thereof was raised to 50° C. to dissolve tetradecylamine while removing hexane by vaporization. Subsequently, the mixture was purged with a nitrogen atmosphere, and the temperature was raised to 270° C. (at a temperature-raising rate of 10° C./min) and maintained for 1 hour after reaching 270° C. The mixture was then allowed to cool to about 100° C., and cooling was continued to about 60° C. while vacuum-degassing the reaction vessel to remove by-products such as a volatile sulfur compound. To the resulting reaction solution, 3 mL of hexane was added, and this was followed by centrifugation to remove coarse particles. Then, 8 mL of methanol was added, and the resultant was centrifuged to precipitate and remove particles having a large particle size, after which 12 mL of methanol was further added to the resulting supernatant to induce precipitation of semiconductor particles, which were subsequently recovered by centrifugation and washed with 10 mL of methanol. Thereafter, the thus obtained semiconductor nanoparticles were dispersed in 3 mL of hexane. For the thus obtained semiconductor nanoparticles, the results of measuring the emission spectrum in the same manner as in Example 14 are shown in Table 4. In addition, the relative emission intensity spectrum of the thus obtained semiconductor nanoparticles, which was normalized by the maximum emission intensity of the semiconductor nanoparticles of Example 14, is shown in FIG. 14.

Example 15

Third Step

A third mixture was obtained by mixing 0.1 mmol of silver ethyl xanthate (Ag(EX)), 0.12 mmol of indium acetate (In(OAc)$_3$), 0.2 mmol of gallium ethyl xanthate (Ga(EX)$_3$), and 0.010 mmol of gallium chloride with 20 mL of oleylamine. This third mixture was heat-treated at 260° C. for 120 minutes with stirring in a nitrogen atmosphere. The thus obtained suspension was allowed to cool and then centrifuged (radius: 146 mm, at 3,800 rpm for 5 minutes), and the resulting precipitate was removed to obtain a dispersion of third semiconductor nanoparticles.

Fourth Step

Subsequently, 10 ml of the thus obtained dispersion containing 0.02 mmol of the third semiconductor nanoparticles in terms of nanoparticle concentration was mixed with 0.07 mmol of gallium chloride ($GaCl_3$) to obtain a fourth mixture. The pressure was reduced while stirring the fourth mixture, and the temperature was raised to 80° C. to perform a heat treatment at 80° C. for 10 minutes with the reduced pressure being maintained. Subsequently, the temperature was further raised to 260° C. in a nitrogen atmosphere to perform a heat treatment for 120 minutes. Thereafter, the resulting suspension was cooled to obtain a dispersion of fourth semiconductor nanoparticles. For the thus obtained fourth semiconductor nanoparticles, the results of measuring the emission spectrum in the same manner as in Example 1 are shown in Table 4 and FIG. 15.

Figure 15:
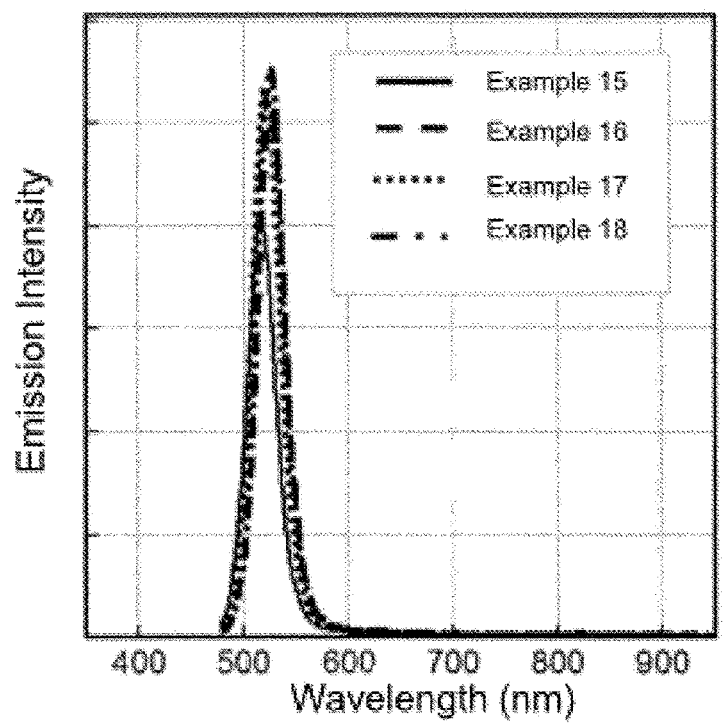
FIG. 15 shows exemplary emission spectra of the semiconductor nanoparticles of Examples 15, 16, 17, and 18.

Example 16 dispersion of fourth semiconductor nanoparticles was obtained in the same manner as in Example 15, except that the amount of gallium chloride in the third mixture obtained in the third step was changed to 0.020 mmol. For the thus obtained fourth semiconductor nanoparticles, the results of measuring the emission spectrum in the same manner as in Example 14 are shown in Table 4. In addition, the relative emission intensity spectrum of the fourth semiconductor nanoparticles, which was normalized by the maximum emission intensity of the semiconductor nanoparticles of Example 15, is shown in FIG. 15.

Example 17

A dispersion of fourth semiconductor nanoparticles was obtained in the same manner as in Example 15, except that the amount of gallium chloride in the third mixture obtained in the third step was changed to 0.015 mmol. For the thus obtained fourth semiconductor nanoparticles, the results of measuring the emission spectrum in the same manner as in Example 14 are shown in Table 4. In addition, the relative emission intensity spectrum of the fourth semiconductor nanoparticles, which was normalized by the maximum emission intensity of the semiconductor nanoparticles of Example 15, is shown in FIG. 15.

Example 18

A dispersion of fourth semiconductor nanoparticles was obtained in the same manner as in Example 15, except that the amount of gallium chloride in the third mixture obtained in the third step was changed to 0.050 mmol. For the thus obtained fourth semiconductor nanoparticles, the results of measuring the emission spectrum in the same manner as in Example 14 are shown in Table 4. In addition, the relative emission intensity spectrum of the fourth semiconductor nanoparticles, which was normalized by the maximum emission intensity of the semiconductor nanoparticles of Example 15, is shown in FIG. 15.

Example 19

A dispersion of fourth semiconductor nanoparticles was obtained in the same manner as in Example 15, except that, in the third step, a third mixture was obtained by mixing 0.04 mmol of silver ethyl xanthate (Ag(EX)), 0.048 mmol of indium acetate ($In(OAc)_3$), 0.08 mmol of gallium ethyl xanthate ($Ga(EX)_3$), and 0.008 mmol of gallium chloride with 20 mL of oleylamine. For the thus obtained fourth semiconductor nanoparticles, the results of measuring the emission spectrum in the same manner as in Example 14 are shown in Table 4 and FIG. 16.

Example 20

Figure 16:
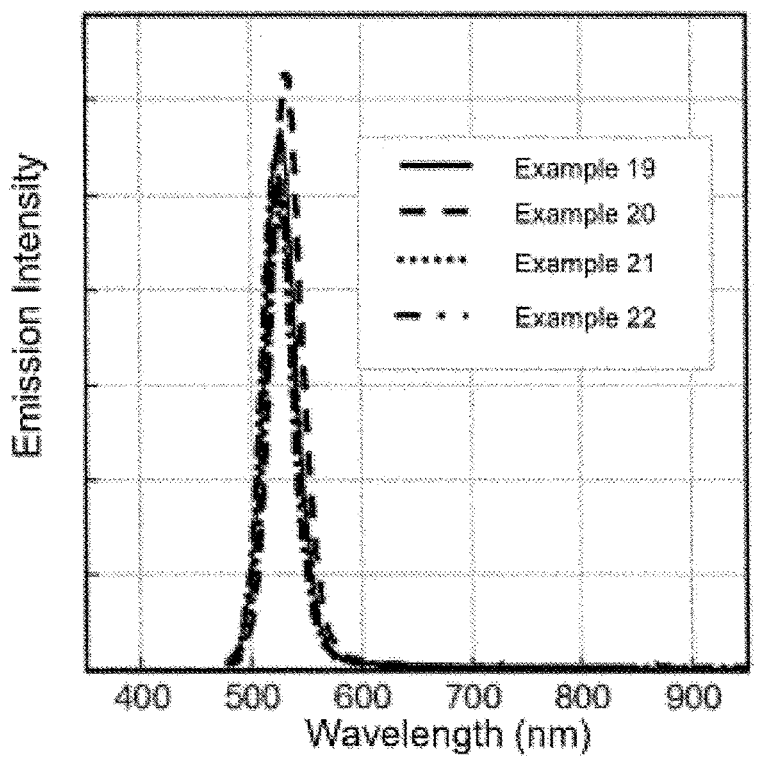
FIG. 16 shows exemplary emission spectra of the semiconductor nanoparticles of Examples 19, 20, 21, and 22.

A dispersion of fourth semiconductor nanoparticles was obtained in the same manner as in Example 19, except that the amount of gallium chloride in the third mixture obtained in the third step was changed to 0.016 mmol. For the thus obtained fourth semiconductor nanoparticles, the results of measuring the emission spectrum in the same manner as in Example 14 are shown in Table 4. In addition, the relative emission intensity spectrum of the fourth semiconductor nanoparticles, which was normalized by the maximum emission intensity of the semiconductor nanoparticles of Example 19, is shown in FIG. 16.

Example 21

A dispersion of fourth semiconductor nanoparticles was obtained in the same manner as in Example 15, except that, in the third step, the third mixture was obtained by mixing 0.06 mmol of silver ethyl xanthate (Ag(EX)), 0.072 mmol of indium acetate ($In(OAc)_3$), 0.12 mmol of gallium ethyl xanthate ($Ga(EX)_3$), and 0.012 mmol of gallium chloride with 20 mL of oleylamine. For the thus obtained fourth semiconductor nanoparticles, the results of measuring the emission spectrum in the same manner as in Example 14 are shown in Table 4. In addition, the relative emission intensity spectrum of the fourth semiconductor nanoparticles, which was normalized by the maximum emission intensity of the semiconductor nanoparticles of Example 19, is shown in FIG. 16.

Example 22

A dispersion of fourth semiconductor nanoparticles was obtained in the same manner as in Example 15, except that, in the third step, the third mixture was obtained by mixing 0.14 mmol of silver ethyl xanthate (Ag(EX)), 0.168 mmol of indium acetate ($In(OAc)_3$), 0.28 mmol of gallium ethyl xanthate ($Ga(EX)_3$), and 0.028 mmol of gallium chloride with 20 mL of oleylamine. For the thus obtained fourth semiconductor nanoparticles, the results of measuring the emission spectrum in the same manner as in Example 19 are shown in Table 4. In addition, the relative emission intensity spectrum of the fourth semiconductor nanoparticles, which was normalized by the maximum emission intensity of the semiconductor nanoparticles of Example 19, is shown in FIG. 16.

TABLE 4

| | Synthesis condition | | | | | | |
|---|---|---|---|---|---|---|---|
| | Ag(EX) (mmol) | Ag(OAc) (mmol) | In(OAc)$_3$ (mmol) | In(acac)$_3$ (mmol) | Ga(EX)$_3$ (mmol) | Ga(acac)$_3$ (mmol) | GaCl$_3$ (mmol) |
| Example 14 | 0.1 | — | 0.12 | — | 0.2 | — | 0.02 |
| Comparative Example 5 | — | 0.4 | — | 0.16 | — | 0.24 | — |
| Example 16 | 0.1 | — | 0.12 | — | 0.2 | — | 0.01 |
| Example 16 | 0.1 | — | 0.12 | — | 0.2 | — | 0.02 |
| Example 17 | 0.1 | — | 0.12 | — | 0.2 | — | 0.015 |
| Example 18 | 0.1 | — | 0.12 | — | 0.2 | — | 0.050 |
| Example 19 | 0.04 | — | 0.048 | — | 0.08 | — | 0.008 |
| Example 20 | 0.04 | — | 0.048 | — | 0.08 | — | 0.016 |
| Example 21 | 0.06 | — | 0.072 | — | 0.12 | — | 0.012 |
| Example 22 | 0.14 | — | 0.168 | — | 0.28 | — | 0.028 |

| | Synthesis condition | | Emission characteristics | | | |
|---|---|---|---|---|---|---|
| | OLA (ml) | DDT (ml) | Peak emission wavelength (nm) | Full width at half maximum (nm) | Bnad-edge emission purity (%) | Quatntum yield (%) |
| Example 14 | 20 | — | 528 | 33 | 76 | 18 |
| Comparative Example 5 | 8 | 0.3 | 554 | 34 | 73 | 20 |
| Example 16 | 20 | — | 519 | 33 | 94 | 58 |
| Example 16 | 20 | — | 529 | 32 | 97 | 84 |
| Example 17 | 20 | — | 523 | 32 | 92 | 81 |
| Example 18 | 20 | — | 528 | 31 | 95 | 64 |
| Example 19 | 20 | — | 529 | 33 | 97 | 83 |
| Example 20 | 20 | — | 534 | 32 | 96 | 87 |
| Example 21 | 20 | — | 530 | 32 | 97 | 85 |
| Example 22 | 20 | — | 525 | 32 | 95 | 77 |

According to Table 4, in Example 14, semiconductor nanoparticles exhibiting band-edge emission with an emission peak wavelength in a range of 480 nm to 560 nm and a high band-edge emission purity were obtained by one-pot synthesis; therefore, one-pot synthesis was confirmed to be a more efficient production method than the method of Comparative Example 5.

According to Table 4, in Examples 15 to 22, semiconductor nanoparticles exhibiting a higher band-edge emission purity and a higher internal quantum yield were obtained as compared to Example 14.

The disclosure of Japanese Patent Application No. 2020-040094 (filed on Mar. 9, 2020) is hereby incorporated by reference in its entirety. All the documents, patent applications and technical standards that are described in the present specification are hereby incorporated by reference to the same extent as if each individual document, patent application or technical standard is concretely and individually described to be incorporated by reference.

DESCRIPTION OF SYMBOLS

1: luminescent material
2: core-shell semiconductor nanoparticle
3: metal compound

The invention claimed is:

1. A method of producing semiconductor nanoparticles, the method comprising:
 obtaining a first mixture containing a Ag salt, an In salt, a compound containing Ga and S, and an organic solvent; and
 performing a heat treatment of the first mixture at a temperature in a range of 125° C. or higher and 300° C. or lower to obtain first semiconductor nanoparticles.

2. The method of producing semiconductor nanoparticles according to claim 1, wherein the temperature of the heat treatment is 125° C. or higher and 175° C. or lower.

3. The method of producing semiconductor nanoparticles according to claim 1, wherein, in the first mixture, a ratio of a number of Ga atoms is 0.1 or more and 0.95 or less with respect to a total number of In and Ga atoms contained in the first mixture.

4. The method of producing semiconductor nanoparticles according to claim 1, wherein the organic solvent comprises an unsaturated fatty acid.

5. The method of producing semiconductor nanoparticles according to claim 1, wherein the compound containing Ga and S comprises a Ga salt of a sulfur-containing compound.

6. The method of producing semiconductor nanoparticles according to claim 1, wherein the first mixture further comprises an alkali metal salt.

7. The method of producing semiconductor nanoparticles according to claim 1, wherein the Ag salt comprises a compound containing Ag and S.

8. A method of producing semiconductor nanoparticles, the method comprising:
 providing a second mixture that comprises the first semiconductor nanoparticles obtained by the method according to claim 1, a compound containing a Group 13 element, and a simple substance composed of a Group 16 element or a compound containing a Group 16 element; and
 performing a heat treatment of the second mixture to obtain second semiconductor nanoparticles.

9. The method of producing semiconductor nanoparticles according to claim 8, wherein the second mixture further comprises an alkali metal salt.

\* \* \* \* \*